United States Patent
Chapman

(10) Patent No.: US 9,050,985 B1
(45) Date of Patent: Jun. 9, 2015

(54) CAMERA DOLLY

(71) Applicant: CHAPMAN/LEONARD STUDIO EQUIPMENT, INC., North Hollywood, CA (US)

(72) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 0 days.

(21) Appl. No.: 14/186,444

(22) Filed: Feb. 21, 2014

Related U.S. Application Data

(63) Continuation-in-part of application No. 14/135,122, filed on Dec. 19, 2013.

(51) Int. Cl.
*F16M 11/42* (2006.01)
*B62B 3/00* (2006.01)
*B66F 11/04* (2006.01)

(52) U.S. Cl.
CPC ............... *B62B 3/001* (2013.01); *B66F 11/048* (2013.01)

(58) Field of Classification Search
CPC ....... F16M 11/42; F16M 11/28; F16M 11/18; F16M 11/08; F16M 11/00
USPC ........... 280/47.41, 47.11, 47.371, 103, 98, 99
See application file for complete search history.

(56) References Cited

U.S. PATENT DOCUMENTS

| | | | | |
|---|---|---|---|---|
| 2,995,380 A | * | 8/1961 | King | 180/409 |
| 4,950,120 A | * | 8/1990 | Barnes | 414/331.12 |
| 5,197,700 A | * | 3/1993 | Chapman | 248/125.1 |
| 5,516,070 A | | 5/1996 | Chapman | |
| 5,697,757 A | * | 12/1997 | Lindsay | 248/280.11 |
| 5,730,450 A | * | 3/1998 | Chapman | 280/47.11 |
| 5,820,088 A | * | 10/1998 | Chapman | 248/161 |
| 6,050,575 A | * | 4/2000 | Lindsay | 280/47.11 |
| 6,073,903 A | * | 6/2000 | Lindsay | 248/404 |
| 6,135,465 A | * | 10/2000 | Chapman | 280/47.11 |
| 6,520,642 B1 | | 2/2003 | Chapman | |
| 6,520,645 B2 | * | 2/2003 | Yamamoto et al. | 353/31 |
| 6,572,059 B1 | | 6/2003 | Chapman | |
| 6,626,117 B1 | | 9/2003 | Chapman | |
| 7,658,359 B2 | * | 2/2010 | Jones et al. | 248/406.1 |
| 7,845,602 B1 | * | 12/2010 | Young et al. | 248/125.8 |

OTHER PUBLICATIONS

Chapman/Leonard Studio Equipment, Inc., 2008-2010 Catalog, pp. 1, 72-73, 77, 80-82, and 100.
Vinten Camera Support Systems, Jan. 2013 Catalog, pp. 1, 25, and 34-37.

* cited by examiner

*Primary Examiner* — Hau Phan
(74) *Attorney, Agent, or Firm* — Kenneth H. Ohriner; Perkins Coie LLP

(57) ABSTRACT

A camera dolly has wheels that can be positively steered via a steering bar operating a corrective and crab mode steering system. A spring holds a steering transmission of the steering system into the crab mode. The dolly operator may shift from the crab mode into the corrective mode by momentarily pushing down on a plunger on the steering bar, when the wheels are straight. After performing a corrective steering maneuver, the spring causes the steering system to automatically return to the crab steering mode when the wheels are steered back to the straight position.

18 Claims, 21 Drawing Sheets

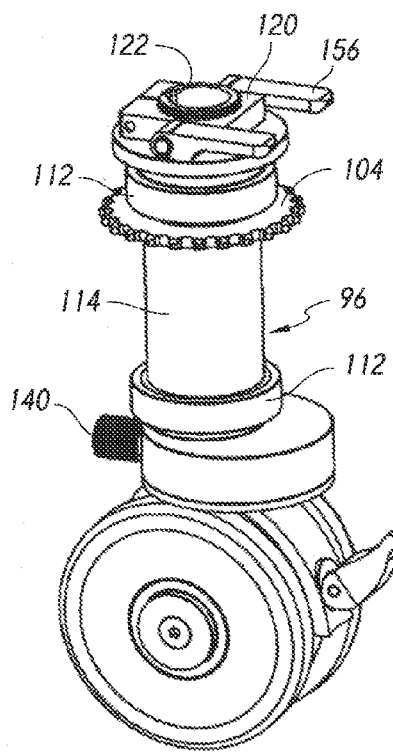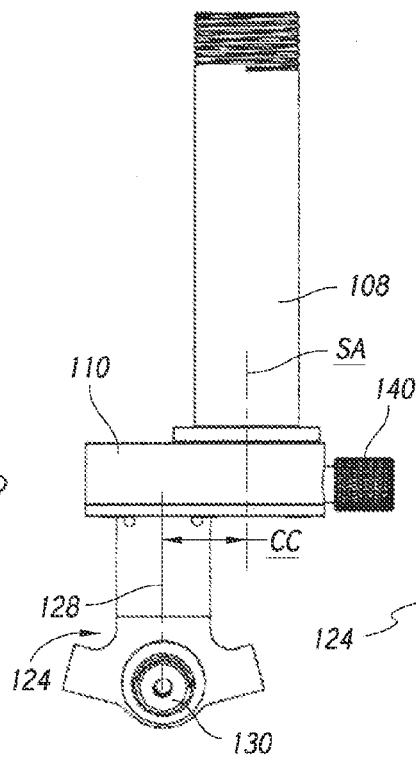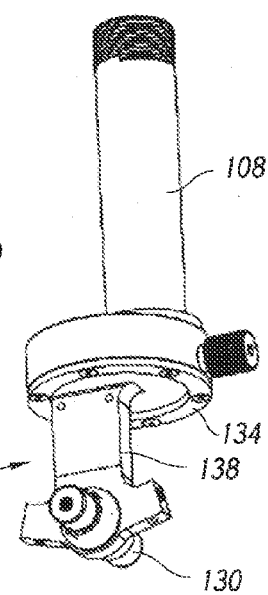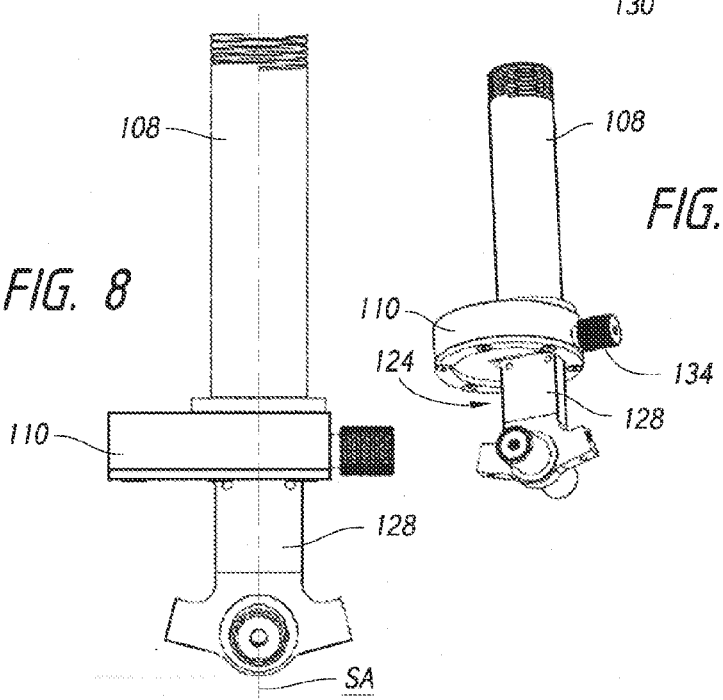

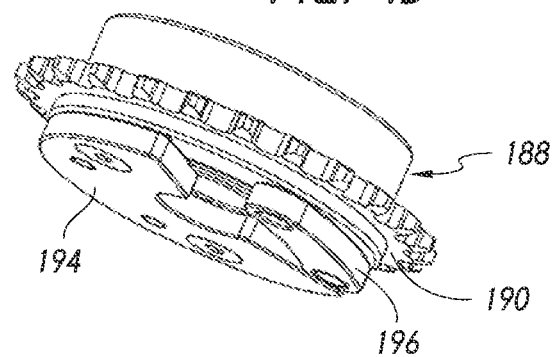
FIG. 15
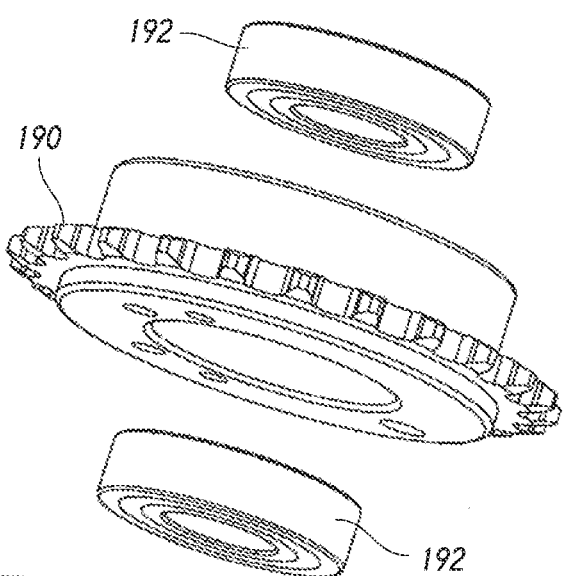
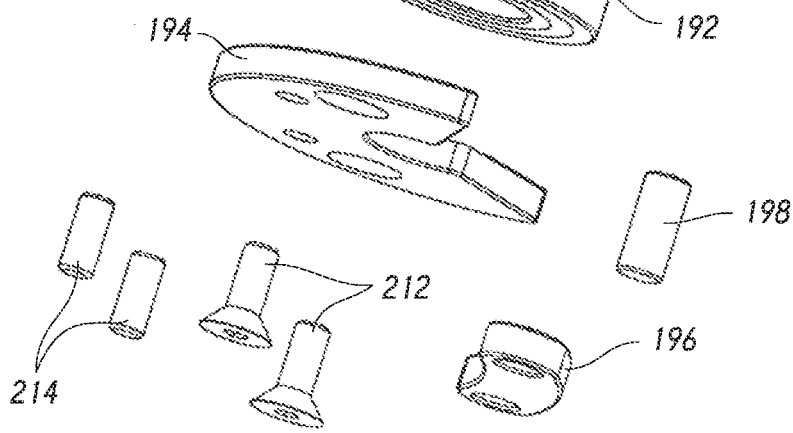
FIG. 16

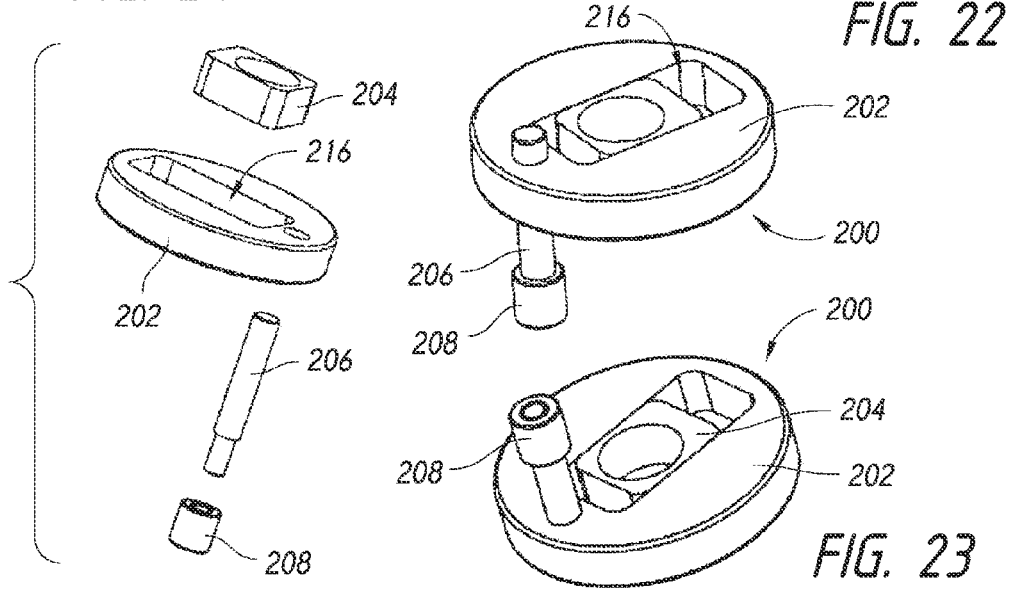

CAMERA DOLLY

This Application is a Continuation-in-Part of U.S. patent application Ser. No. 14/135,122 filed Dec. 19, 2013, now pending, and incorporated herein by reference.

BACKGROUND OF THE INVENTION

Video, television, and motion picture cameras must often be positioned in a particular way for a video or film sequence. The camera must also move to follow an action sequence or obtain a desired cinematographic effect. Generally, all movement of the camera must be uniform and smooth without any bumping, rocking, tilting, vibration or other movement that will cause the recorded images to jump when viewed on a screen. A camera dolly or camera dolly is used to provide smooth camera movement.

Conventional camera dollies and pedestals have steering systems which positively steer the wheels of the dolly via the operator turning a steering bar or handle. Steering and positioning the dolly may be challenging, even for an experienced operator, because precise positioning and timing is often required. Many camera dollies having a steering transmission which allows the dolly to be steered in either a crab mode or a corrective mode. The ability to shift between steering modes can help the camera dolly operator move the dolly as desired. Still, improved camera dollies are needed and engineering design challenges remain in designing camera dollies.

BRIEF DESCRIPTION OF THE DRAWINGS

In the drawings the same element number indicates the same element in each of the views.

FIG. 1 is a perspective view of a camera dolly.

FIG. 2 is a perspective view of the base of the camera dolly of FIG. 1 shown separately.

FIG. 3 is a side view of the column of the camera dolly of FIG. 1 shown separately.

FIG. 4 is an exploded perspective view of the base shown in FIG. 2, with the steering chains removed for clarity of illustration.

FIG. 5 is a perspective view of one of the leg assemblies of the base as shown in FIG. 4.

FIG. 6 is a side view of the leg assembly of FIG. 5 in the caster position, with components omitted for purpose of illustration.

FIG. 7 is a perspective view of the leg assembly shown in FIG. 6.

FIG. 8 is a side view of the leg assembly of FIG. 5 in the steer position, with components omitted for purpose of illustration.

FIG. 9 is a perspective view of the leg assembly shown in FIG. 8.

FIG. 10 is an exploded perspective view of the entire leg assembly shown in FIG. 5.

FIG. 11 is an exploded perspective view of the leg assembly shown in FIG. 10 with the axle frame separated from the riser, and with components omitted, for purpose of illustration.

FIG. 12 is a perspective view of the cam lock shown in FIGS. 1, 2, 5 and 10.

FIG. 13 is a perspective view of the steering transmission shown in FIG. 4.

FIG. 14 is an exploded perspective view of the steering transmission shown in FIG. 13.

FIG. 15 is a perspective view of the top sprocket assembly shown in FIG. 14.

FIG. 16 is an exploded perspective view of the top sprocket assembly shown in FIG. 15.

FIG. 17 is a perspective view of the middle sprocket assembly shown in FIG. 14.

FIG. 18 is an exploded perspective view of the middle sprocket assembly shown in FIG. 17.

FIG. 19 is a top perspective view of the bottom sprocket assembly shown in FIG. 14.

FIG. 20 is a bottom perspective view of the bottom sprocket assembly shown in FIGS. 14 and 19.

FIG. 21 is an exploded perspective view of the bottom sprocket assembly shown in FIGS. 19 and 20.

FIG. 22 is a top perspective view of the differential shown in FIG. 14.

FIG. 23 is a bottom perspective view of the differential shown in FIGS. 14 and 22.

FIG. 24 is an exploded perspective view of the differential shown in FIGS. 14, 22 and 23.

FIG. 25 is top, rear and right side view of the base shown in FIGS. 2 and 4, with components removed for clarity of illustration.

FIG. 26 is top, front and left side view of the base shown in FIGS. 2 and 4, with components removed for clarity of illustration.

FIG. 27 is a perspective view of an alternative dolly design.

FIG. 28 is a partial section view of the steering handle and transmission of the dolly shown in FIG. 27.

FIG. 29 is a perspective view of the steering transmission of the dolly shown in FIGS. 27-28.

FIG. 30 is an enlarge section view of the steering handle and steering transmission shown in FIG. 28.

FIG. 31 is an exploded perspective view of the steering transmission shown in FIGS. 28-30.

FIG. 32 is an exploded perspective view of an alternative handle which may be used with the dolly shown in FIGS. 1-31.

FIG. 33 is an assembled perspective view of the handle shown in FIG. 32.

FIG. 34 an enlarged perspective view of components of the handle shown in FIGS. 32 and 33.

FIG. 35 is an enlarged perspective view of internal components of the handle shown in FIGS. 32 and 33.

DETAILED DESCRIPTION

As shown in FIG. 1, a camera dolly 30 includes a base 50 which rolls on wheels. A telescoping column 44 may be removably supported on or in the base 50, with a tank 48 at the lower end of the column 44 positioned within a ring 60 of the base 50. The column may be provided as described in U.S. Pat. No. 5,197,700; 5,516,070 or 5,820,088, incorporated herein by reference. Similarly, various alternative telescoping columns, including electrically powered and mechanically weight compensated columns may be used. The base 50 may alternatively be used with a fixed height column or riser, for example with the base 50 having a flat closed top deck with no ring 60. That is the base 50 may alternatively be used as a camera dolly, with a boom arm, seating accessories, etc.

In a typical set up as shown in FIG. 1, a swing head 32 is mounted on the column platform 46. A pan-tilt head 34 is attached onto the swing head 32, and a camera 36 having a lens 38 is attached to the pan-tilt head 34. Of course the type of heads used on the dolly, if any, will vary depending the on use contemplated.

FIG. 2 shows the base 50 with the column 44 removed. As shown in FIG. 3 the column 44 may be removed from the base 50 and used alone. The base 50 modified to cover or omit the central opening within the ring 60, may also be used alone, or used apart from any column.

Figure 2:
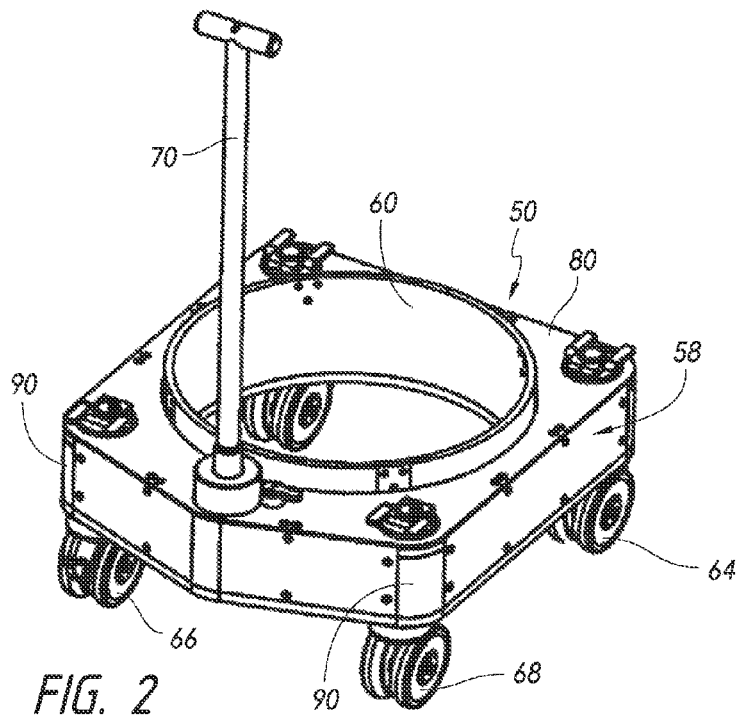
Figure 3:
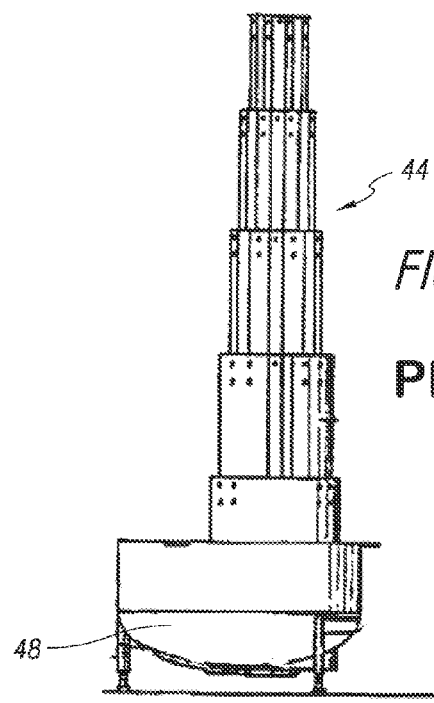
Figure 4:
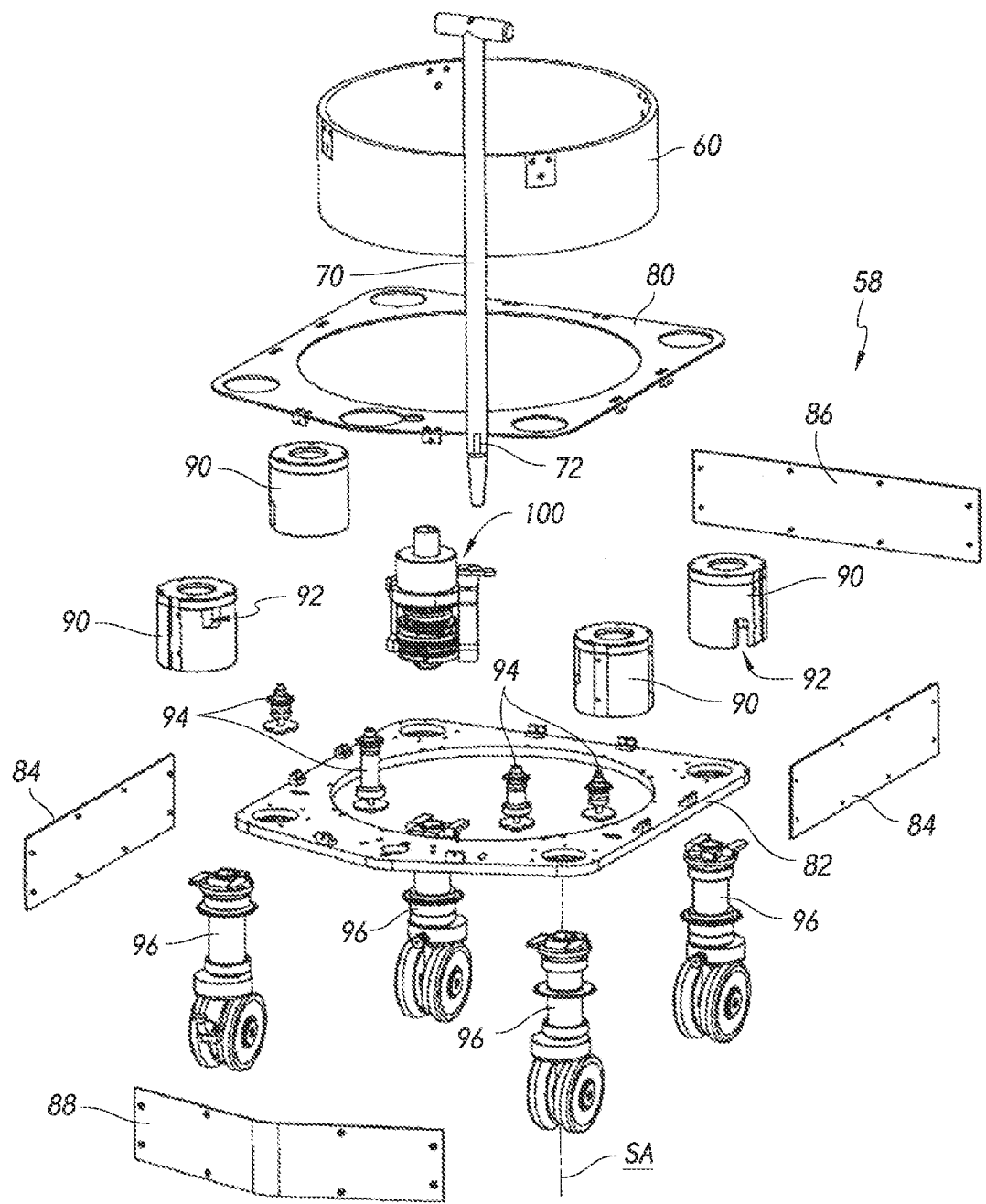

Referring to FIG. 4, the base 50 may be constructed with a top plate 80 supported on sprocket housings 90 position near the corners of a bottom plate 82, with side plates 84, a rear plate 88 and a front plate 86 forming an enclosed chassis 58. As shown in FIG. 2, the outside cylindrical surface of each of the sprocket housings 90 may have relieved sections or slots to allow the plates 84, 86 and 88 to fit near flush, with the sprocket housings 90 providing structural attachment for the plates 84, 86 and 88, as well as for the top and bottom plates. Each of the four sprocket housings 90 may have the same design, except for the positions of the chain slots 92 further described below.

Figure 10:
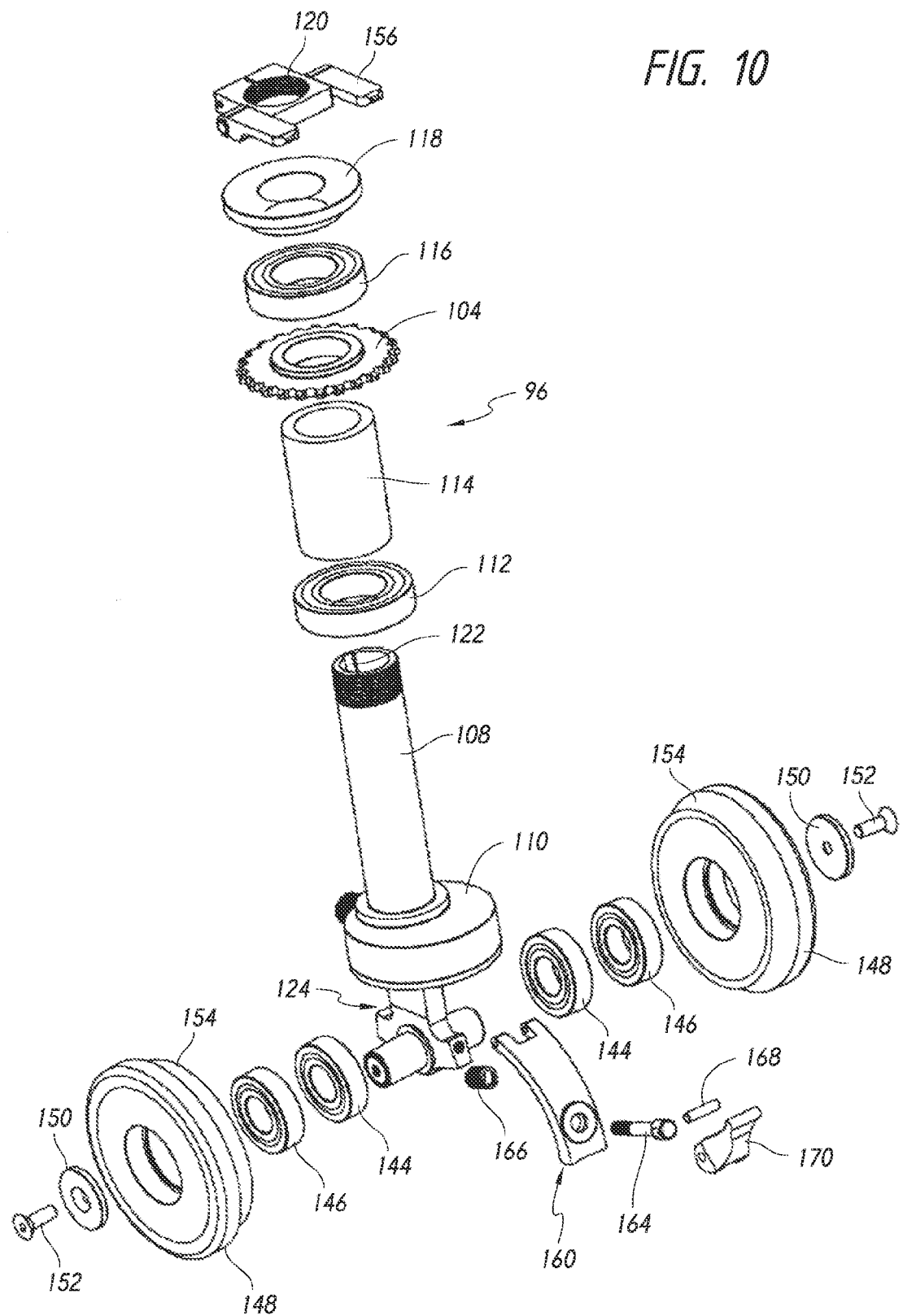
Figure 11:
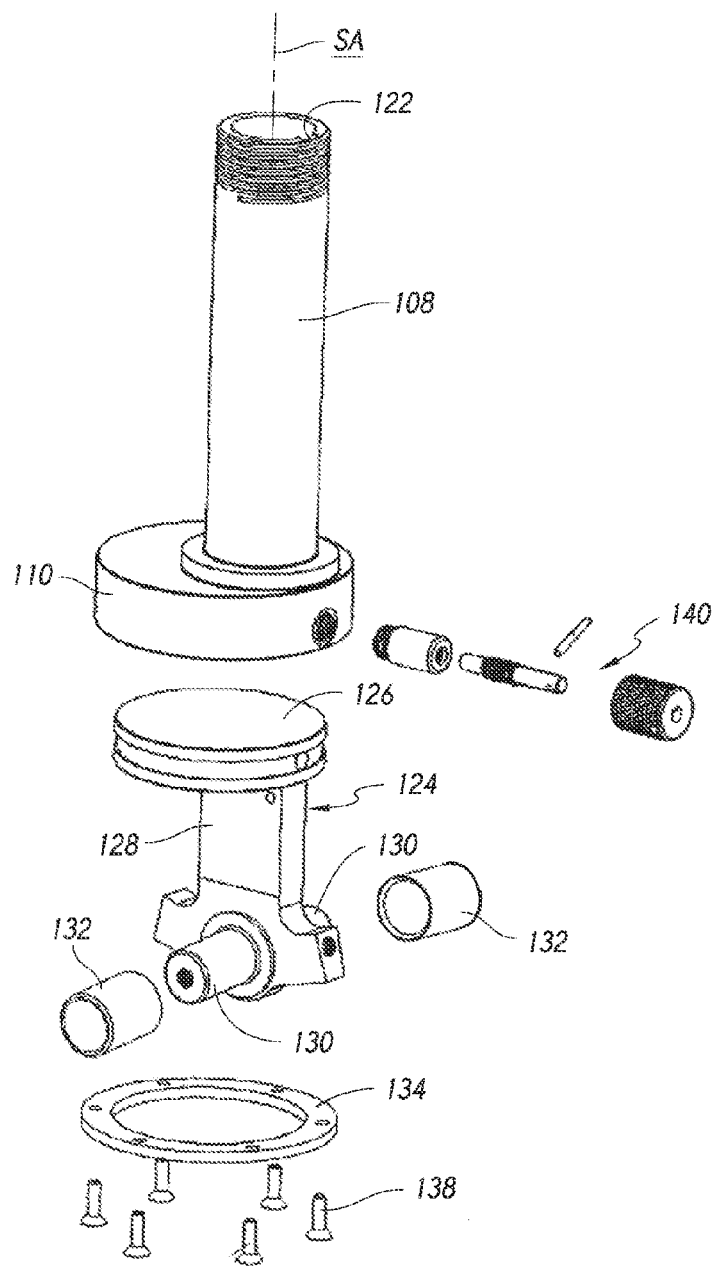

Turning now to FIGS. 4-11, a leg assembly 96 is provided near each corner of the chassis 58. As shown in FIG. 11, each leg assembly 96 may include a riser 108 having an externally threaded upper end, optionally with a key way 122 in the inner cylindrical wall of the riser 108. The riser may be joined to a cup 110. An axle frame 124 has a disk 126 rotatably positioned within the cup 110, with an offset arm 128 joined to the bottom side of the disk 126, at an off center position. Axles 130 on the arm 128 may extend down at a slight angle. Each leg assembly 96 is rotatable about a steering axis SA extending centrally and vertically through the leg assembly 96.

Referring still to FIG. 11, a retainer ring 134 and bolts 138 may retain the disk 126 within the cup 110. A fastener, such a pin or bolt may be used to temporarily allow rotational movement between the axle frame and the riser, to shift between normal and caster mode configurations. The drawings show a thumbscrew 140 threaded into one side of the cup 110 for this purpose. When the thumbscrew 140 is loosened, the axle frame 124 can be rotated within the cup 110, to change the alignment between the riser 108 and the offset arm 128.

As shown in FIG. 11, a hardened axle sleeve 132 may be pressed onto each axle 130, with a wheel 148 mounted on inner and outer bearings 144 and 146 on the axle 130. A wheel bolt 152 and cap 150 may be used to secure the wheel 148 in place. As shown in FIG. 10, a brake assembly 160 may be provided on each leg assembly 96, or more typically on the rear left and rear right leg assemblies. If used, the brake assembly 160 may be provided with a brake arm 162 pivotally attached to the axle frame 124, with a spring 166 pushing the brake arm 162 up and away from the wheels 148. A brake lever 170 having a cam surface is pivotally attached to the head of a bolt 164 via a pin 164, with the bolt 164 threaded into the axle frame 124. With the lever 170 in the up position, the spring 166 holds the arm 162 up and out of contact with the inner surface 154 of the wheels 148, so that the wheels roll freely. The brake is actuated by pushing the lever 170 down causing the bottom surface of the lever 170 to forcibly contact the inner surface 154 of the wheel 148, preventing the wheel from rolling. The lever 170 may be foot-operated.

Figure 12:
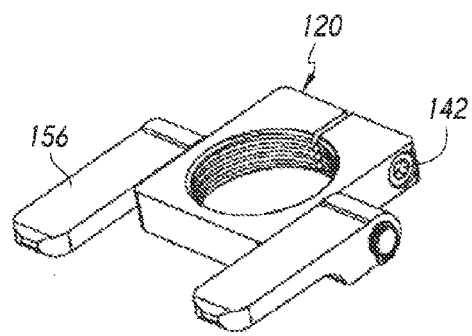

Referring to FIGS. 5, 10 and 12, a lower bearing 112, a sleeve 114, a leg sprocket 104, an upper bearing 116 and a pressure plate 118 are provided on the riser 108. During assembly a cam lock 120 is threaded down onto the top end of the riser 108 to a position where it securely holds together the components on the riser 108. A cross bolt 142 is then tightened clamping the split collar of the cam lock 120 onto the riser 108. Referring to FIG. 10, with the tabs or levers 156 of the cam lock 120 in the down position, the cam lock 120 presses the pressure plate 118 down clamping the inner races of the bearings 112 and 116 against the sprocket 104, locking the sprocket 104 to the riser 108. Turning movement of the sprocket 104 then necessarily rotates the entire leg assembly 96 during use. With the levers 156 in the up position, the sprocket 104 is released, allowing the leg assembly 96 to rotate independently of the sprocket 104.

The four leg assemblies 96 may have the same design, except for the vertical position of the leg sprocket, and with the rear leg assemblies also shown with brakes 160. Although wheel pairs are shown in the drawings, the base may also be designed with a single wheel on each leg assembly. As used here, wheel set means a single wheel or dual wheels as shown. FIG. 5 shows the rear left leg assembly having leg sprocket 104. The other leg sprockets are the rear right sprocket 106 on the rear right leg assembly, the front leg sprockets 102 on the left and right front leg assemblies.

Turning to FIGS. 13, 14, 25 and 26, the base 50 may be provided with a steering system generally designated 52 having a steering transmission 100 and chains connecting transmission sprocket assemblies 188, 220 and 240 in the transmission 100 with the leg sprockets 102, 104 and 106 on the leg assemblies 96. The transmission 100 may be contained within a housing 180 having a cap 182 extending up through an opening at a rear central position of the top plate 80 of the base chassis 58, with side plates 210 of the housing 180 bolted onto the bottom plate 82.

Figure 1:
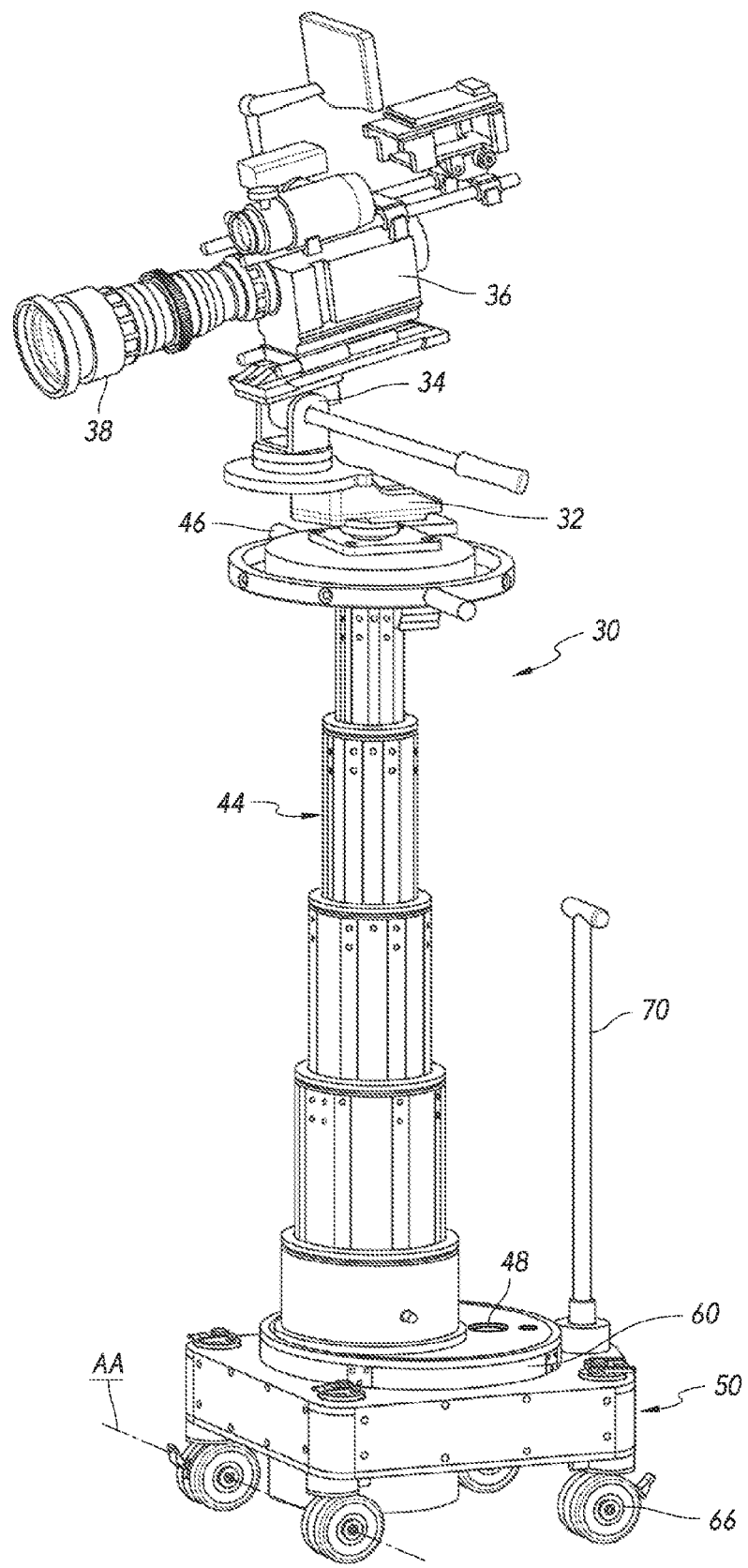
Figure 13:
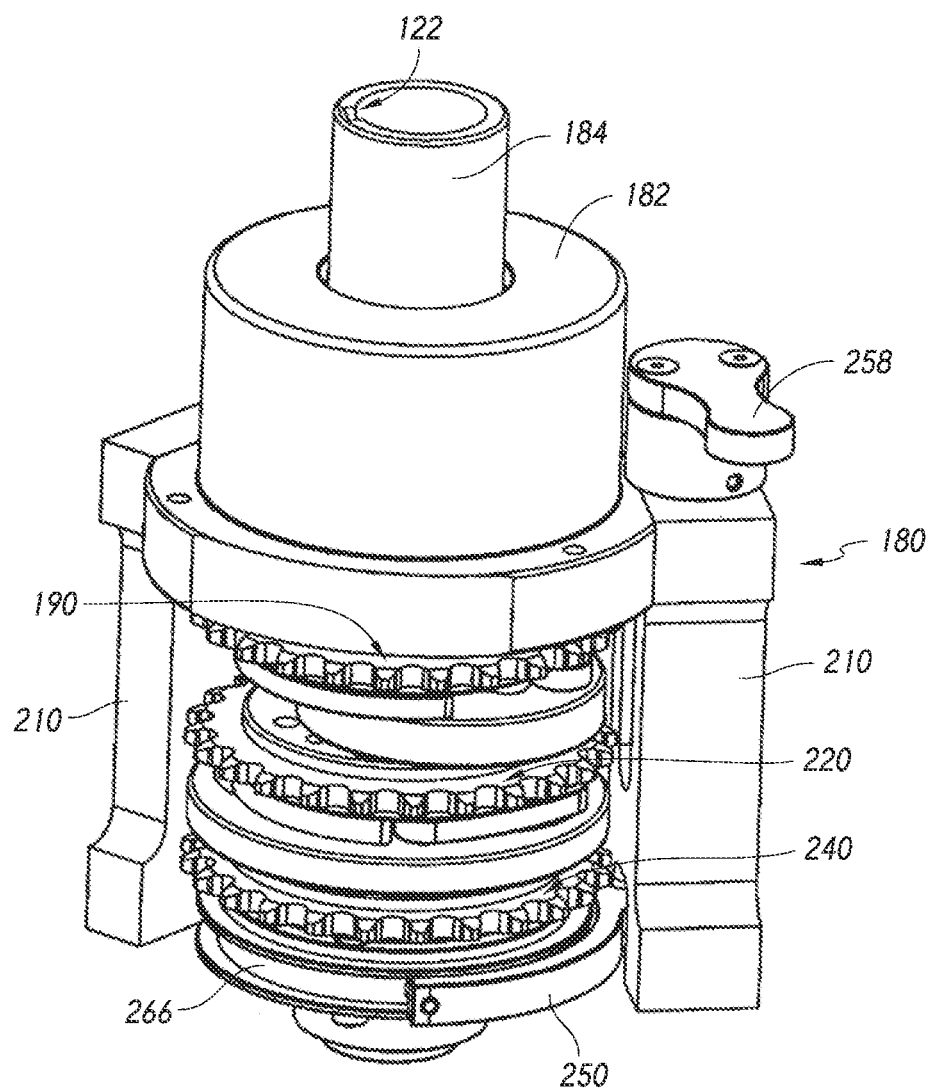
Figure 14:
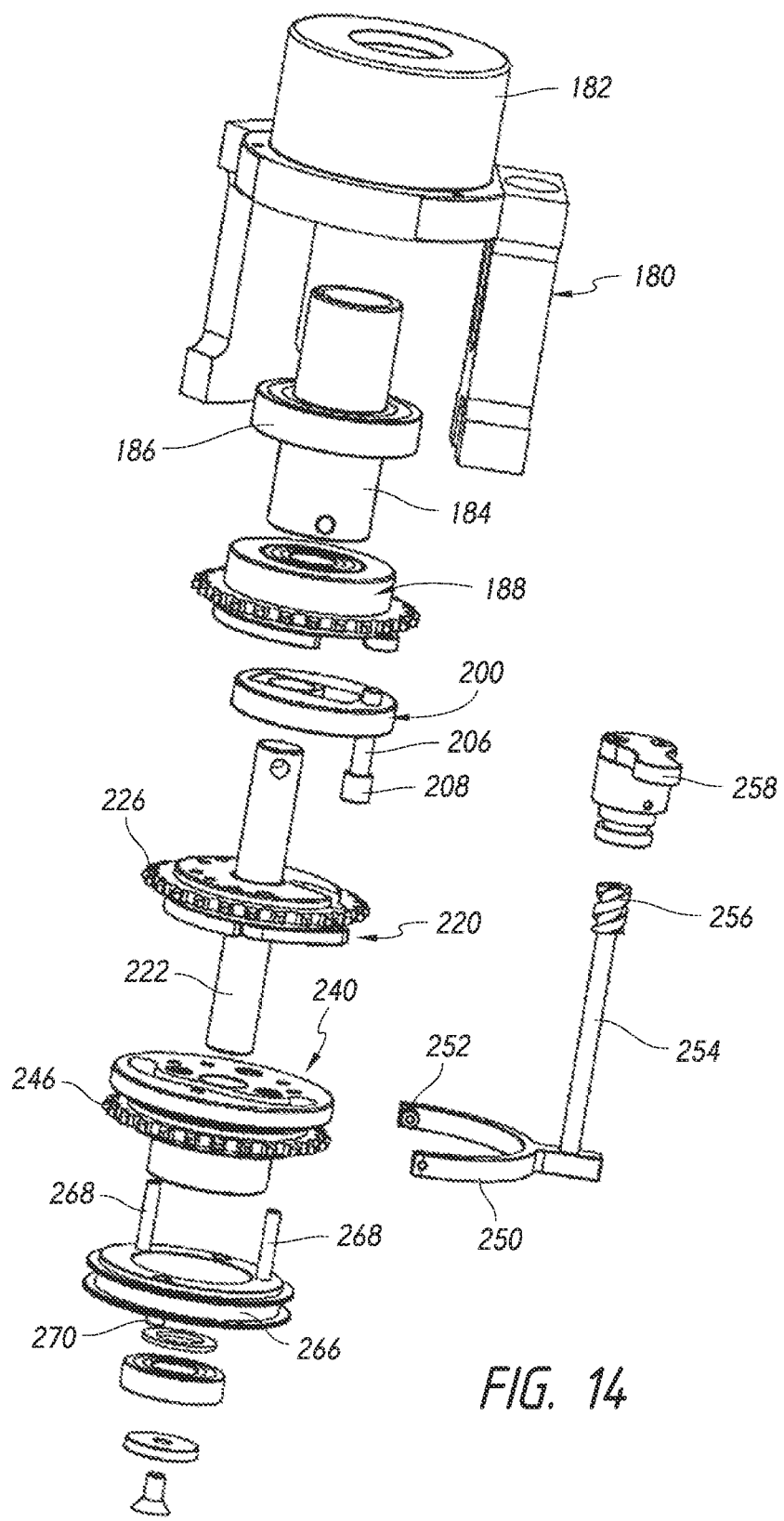
Figures 17, 18:
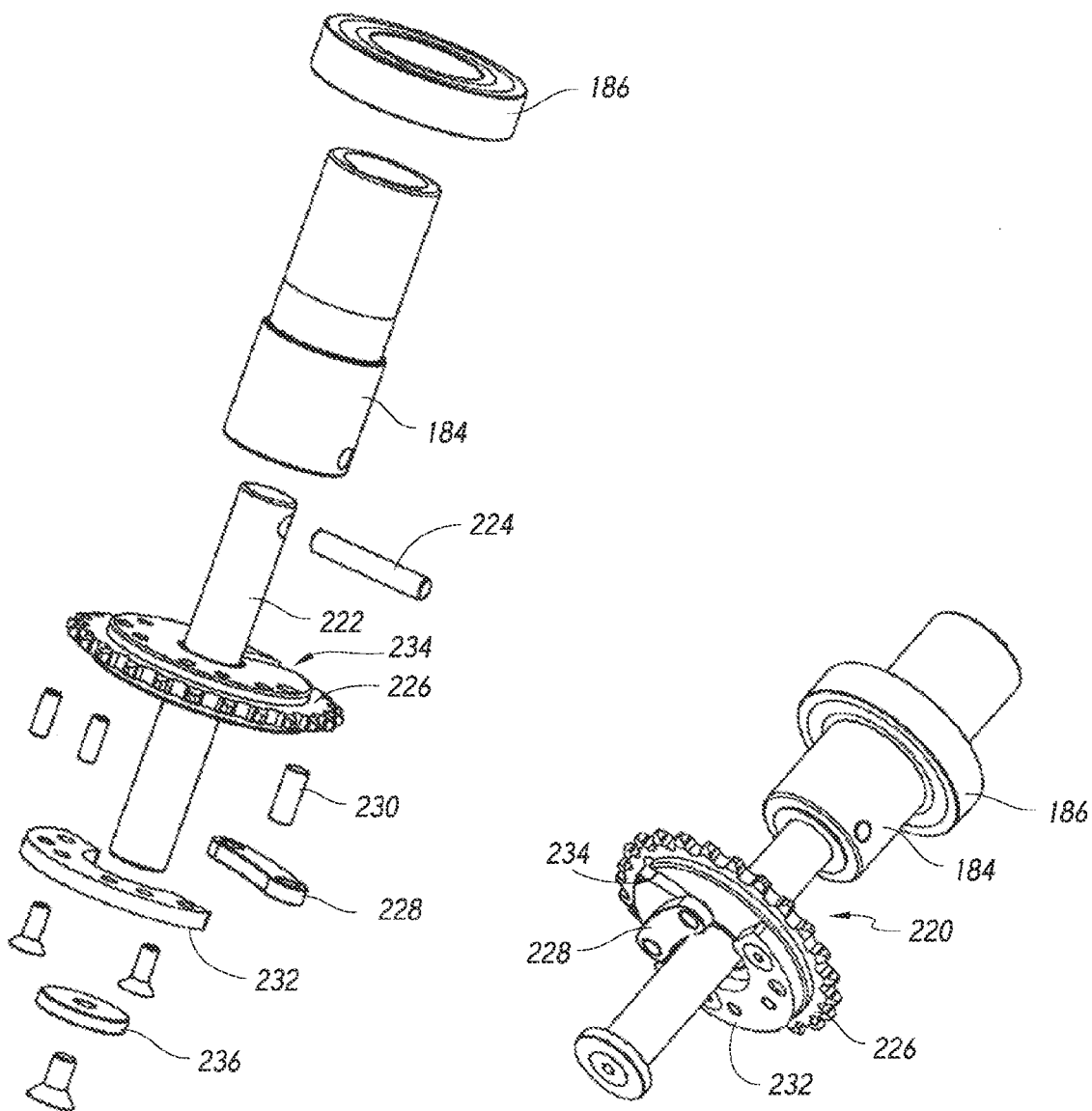

The steering transmission may have an axle 222 passing centrally through top, middle and bottom sprocket assemblies. As shown in FIGS. 14 and 18, the axle is rigidly attached to a shaft 184 via an axle pin 224. The top end of the shaft 184 may extend up through the cap 182, as shown in FIGS. 1 and 13. Referring back to FIG. 16, bearings 192 on or in the top sprocket assembly 188 allow the top sprocket 190 to rotate freely on the axle 222, and allow the shaft 184 to rotate freely within the transmission housing 180.

Referring to FIGS. 15 and 16, the top sprocket assembly 188 has a C-plate 194 rigidly attached to a top sprocket 190 via bolts 214 and/or pins 212. An arm 196 is pivotally attached to the top sprocket 190 on a pivot pin 198. Referring to FIGS. 17 and 18, in the middle sprocket assembly 220, a middle sprocket 226 is rigidly attached to and rotates with the axle 222. Similar to the top sprocket assembly 188, in the middle sprocket assembly 220 a C-plate 232 is rigidly attached to the bottom surface of the middle sprocket 226, and an arm 228 is pivotally pinned or attached the bottom surface of the middle sprocket 226. A sprocket through slot 234 in the middle sprocket 226 extends generally radially outwardly from near the axle 222 to near the teeth on the outer circumference of the sprocket 226.

As shown in FIG. 20, the bottom sprocket 246 is rotatably mounted on bearings 248 on the axle 222 so that it can rotate free of the axle. As shown in FIG. 19 a contoured roller slot 244 is provided in the top surface of the bottom sprocket 246. Referring to FIGS. 14 and 22-24, a differential 200 is provided between the top and middle sprockets. The differential 200 may include a slider 204 which slides in a slot 216 in a differential plate 202. The axle 222 extends through a central clearance opening in the slider 204, holding the slider 204 in a central position while allowing the axle 222 to rotate relative to the slider 204, and allowing the differential plate 202 to shift into off-center positions. A roller pin 206 rigidly attached to the outer end of the arm 196, extends down through the sprocket slot 234 in the middle sprocket 226 and through a clearance hole in the outer end of the arm 228, with a roller 208 rotatably attached onto the lower end of the pin 206 positioned in the roller slot 244 in the top surface of the bottom sprocket 246. The shape of the roller slot 244 which provides corrective steering, may be determined directly based on the lateral wheelbase or spacing between the steering axis of the left side and right side leg assemblies, by sequentially plotting points that provide steering geometry as shown in FIG. 47A of U.S. Pat. No. 6,520,642.

Turning back to FIG. 14, a fork ring 266 has shift pins 268 projecting up through holes in the bottom sprocket 246. A fork 250 has rollers 252 positioned within a groove in the fork ring 266. A shaft 254 attached to the fork 250 has a lead screw 256 engaged with a fork lever 258. Turning the fork lever 258, e.g., ¼ turn, lifts and lowers the fork 250, moving the fork ring 266 into an up position, where the shift pins 268 extend into holes in the middle sprocket 226, and moving the fork ring 266 into a down position, where the shift pins 268 are withdrawn from the middle sprocket 226. Lock pins 270 extend down from the bottom surface of the fork ring 266. With the fork ring 266 in the down position, the lock pins project into openings in the bottom plate 82, locking the fork ring 266, and the bottom sprocket 246, so that they cannot rotate. With the fork ring 266 in the up position the lock pins 270 are withdrawn from the openings in the bottom plate so that the fork ring 266 and the bottom sprocket 246 are free to rotate.

Camera dollies often have steering systems to provide corrective steering or crab steering, or both. The steering geometry and principles of these steering modes are described in U.S. Pat. No. 6,520,642, incorporated herein by reference.

Figure 25:
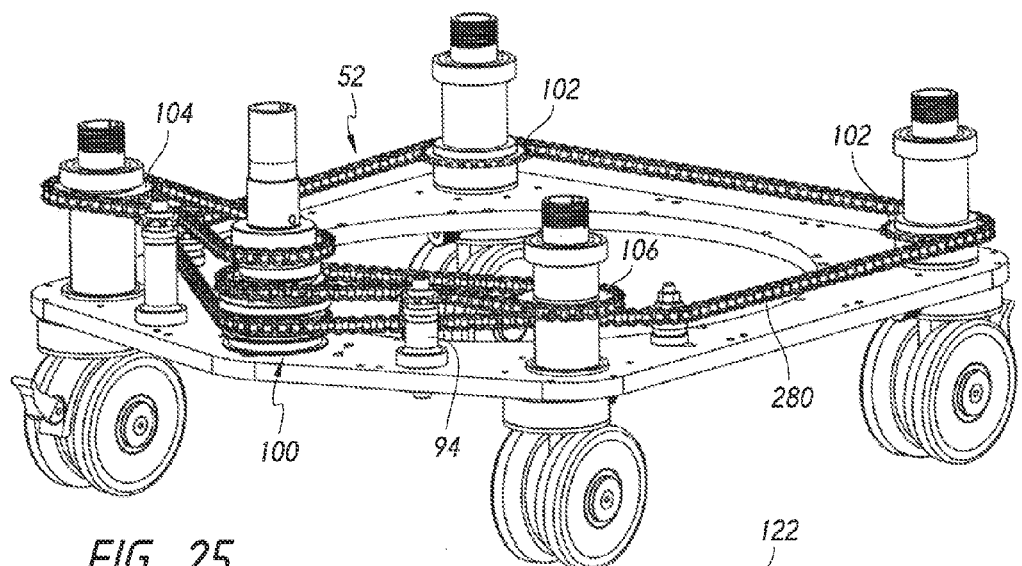
Figure 26:
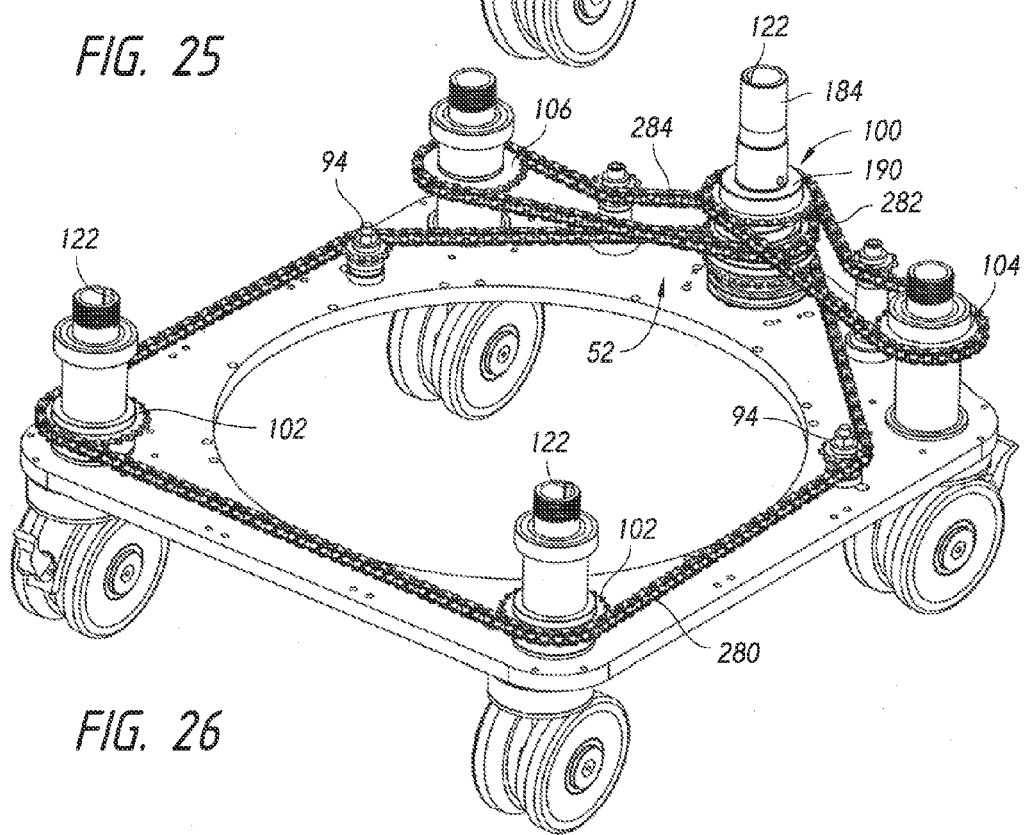

As shown in FIGS. 25 and 26 the steering system 52 has a crab chain 280, a left chain 282 and a right chain 284. The crab chain 280 extends continuously around the front sprockets 102 on the left and right front leg assemblies 96 and also around the bottom sprocket 246 of the steering transmission. The left chain 282 extends continuously around the left rear sprocket 104 and around the top sprocket 190 of the steering transmission 100. The right chain 284 extends continuously around the right rear sprocket 106 and around the middle sprocket 226 of the steering transmission 100. Idlers 94 are provided to maintain the chains appropriately tensioned and positioned. As shown in FIGS. 25 and 26, the front sprockets 102 are both at a low vertical position on the leg assembly 96, the right rear sprocket 106 is at an intermediate vertical position and the left rear sprocket 104 is at a high vertical position. The chains 280, 282 and 284 are at corresponding vertical positions, to provide clearance between them.

The steering system 52 is engaged by locking the cam locks 120. At each leg assembly 96, locking the cam lock 120 clamps the sprocket 102, 104 or 106 of the leg assembly to the riser 108 so that they both rotate together. The wheels are aligned in the straight ahead position before locking the cam locks 120. The steering bar 70 is inserted into the shaft 184 with the key 72 in the keyway 122, so that rotating the steering bar 70 rotates the shaft 184 and the axle 222. The leg assemblies 96 are in the normal position as shown in FIGS. 8 and 9, with the axles 130 on the centerline of the riser 108.

For crab steering, where all of the wheel sets are steered to the same angle, the shift lever 258 is turned to move the fork ring 266 into the up position. The lock pins 270 are withdrawn from the openings in the bottom plate 82, or other fixed element, so that the bottom sprocket can freely rotate. Turning movement of the steering bar turns the axle 222 and the middle sprocket 226. Since the shift pins 268 lock the bottom sprocket 246 to the middle sprocket 226, turning the steering bar 70 rotates the bottom sprocket which drives the crab chain, causing both front wheels to steer to the same angle. At the same time, the right rear sprocket 106 is also steered to the same angle as the front wheels via the middle sprocket driving the right chain 284. Similarly, the top sprocket 190 is rotated along with the middle sprocket 226 via the connection between them formed by the pivoting arms 196 and 228 and the pin 206. The top sprocket drives the left chain 282 and the left rear sprocket 104 also to the same steering angle, so that all four wheel sets are steered to the same angle.

For corrective steering, the shift lever 258 is rotated to move the fork ring 266 into the down position. The fork ring 266 and the bottom sprocket 246 are locked against rotation via the lock pins 270 engaged into holes in the bottom plate 82 or other fixed structure. This locks the front wheel sets into the straight ahead position. Turning the steering bar 70 turns the axle 222 which drives the middle sprocket 220, causing the right rear sprocket 106 and the right rear wheel sets to a first steering angle. The top sprocket 190 is driven through the differential 200 to a corrected steering angle via the roller 208 moving in the roller slot 244. The left rear sprocket 104 and the left rear wheel sets are consequently steered to a corrected steering angle. The base 50 therefore achieves corrected steering so that the wheels track precisely with little or no slipping or skidding as the base moves in a curved path.

The base 50 may also be steered by inserting the steering bar 70 into the riser 108 or any one of the four leg assemblies 96. This allows the operator to steer the base 50 from any one of five different positions. The steering bar 70 is very quickly and easily inserted and removed since no screw thread or other fittings are used. Rather the steering bar 70 is simply inserted and turned to engage the keyway. The shift lever 258 may also have a third position where the axle 222 is locked out against rotation, thereby locking all of the wheels at a fixed steering angle, typically at the straight ahead steering angle.

The steering system 52 is disengaged when the operator wants to use the base 50 as a caster mode dolly, which is simply pushed and not steered. The cam locks 120 are released or unlocked, by lifting the levers 156, allowing the leg assembly 96 to rotate independently of the sprocket 102, 104 or 106. The thumb screw 140 on each leg assembly 96 is loosened. The axle frame 124 is turned ½ turn, from the normal position shown in FIGS. 6 and 7 to the caster or offset position shown in FIGS. 8 and 9. The thumb screws 140 are retightened. The wheels then act as caster wheels, allowing the base 50 to be pushed in any direction. The offset of the wheel axles 130 from the riser 108 is shown as dimension CC in FIG. 6, with dimension CC typically ranging from about ¾ to 1¼ inches. The dolly may optionally be temporarily lifted up off of the ground to un-weight the leg assemblies, to make it easier to rotate the axle frames 124 when configuring the dolly for caster movement.

The base 50 may be compact and lightweight, so that it may be used in confined spaces and be easily lifted and carried by one or two people. For example, in one design the base has a width and length of about 20 inches and weighs about 40 pounds. The base 50 may also be designed so the wheel sets are spaced apart by 16 inches, to allow the base to operate on narrow track. As shown in FIG. 1, the camera 36 may be positioned on the column with the lens 38 aligned with an axis AA passing through the front wheels. Alternatively the camera 36 may be positioned so that the center of the camera coincides with the center of rotation of the base 50 during corrective steering.

Although chains and sprockets are shown and described, they may of course be replaced by belts and pulleys, and especially tooth belts. As used here, reference to chains and sprockets includes belts and pulleys. The specific design of the disk 126 rotatable within the cup 110 to achieve caster offset is provided as an example. Caster offset may alternatively be achieved in other ways using cams, linear tracks, arms similar to arm 128 but having a pivotable joint, arms 128 having dual sets of axles, one set for steering and one for caster operation, etc. These are collectively referred to here as a caster fitting, i.e., a component that allows switching between normal and caster positions. The claims below encompass these alternatives as well. The terms sprocket and chain in the claims include use of pulleys and belts. The terms rotatable and rotatably refer to turning movement, which may be greater than or less than 360 degree movement. The steering transmission 100 may be replaced with various other types of steering transmissions, for example as described in U.S. Pat. No. 6,520,642, or steering transmissions providing similar steering functions using gears, cams, levers, or other elements.

Figure 27:
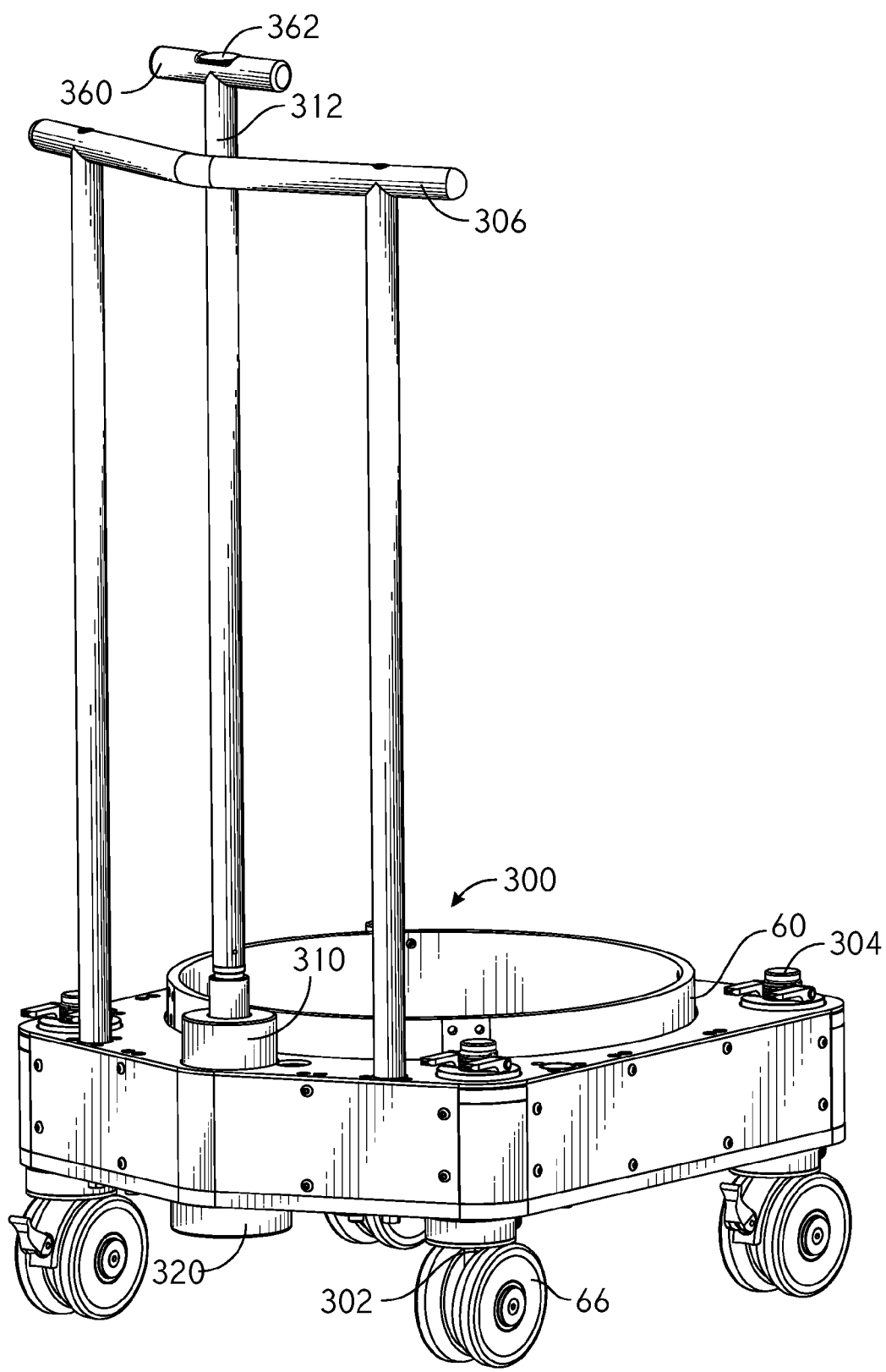
Figure 28:
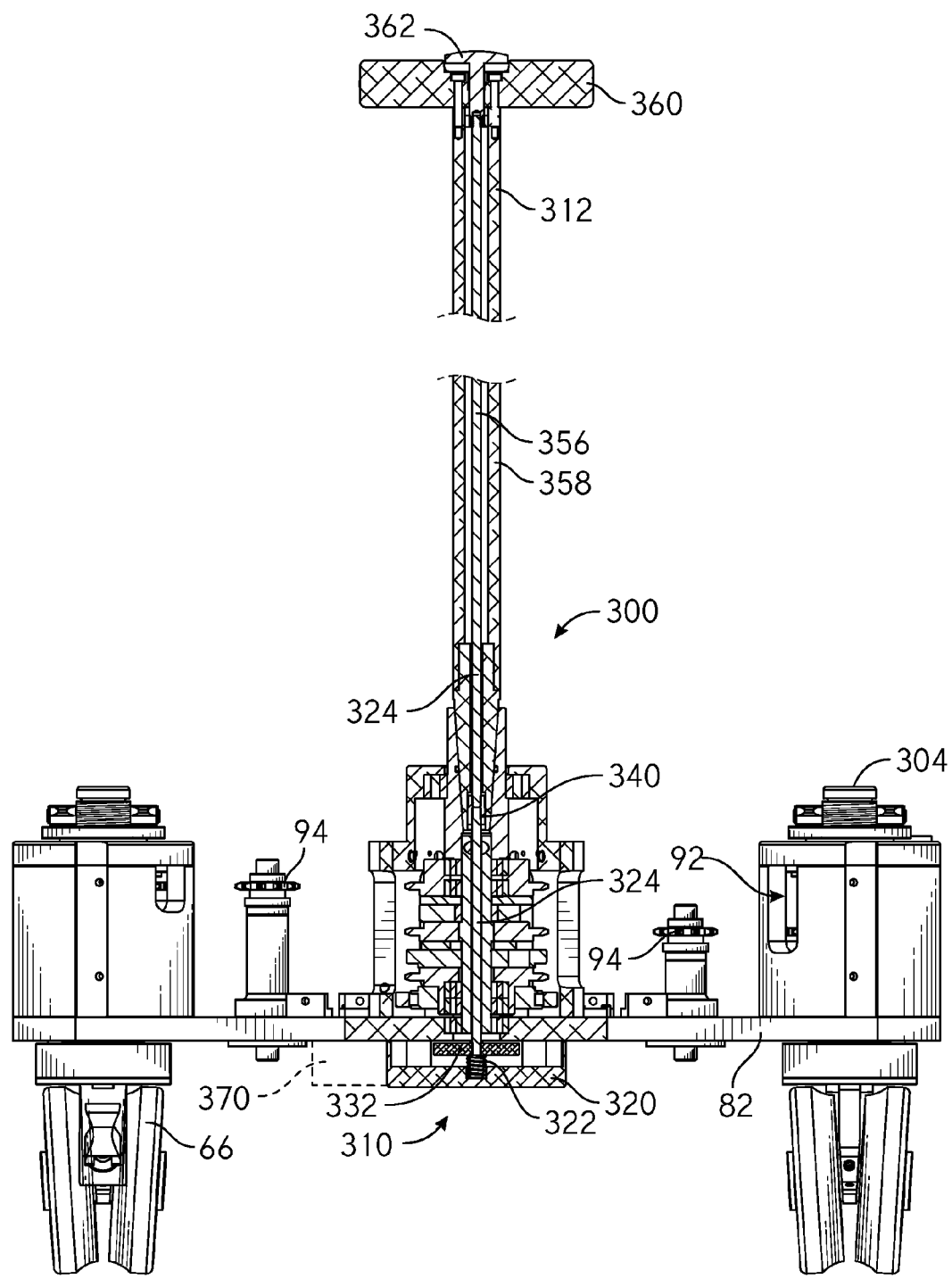
Figure 29:
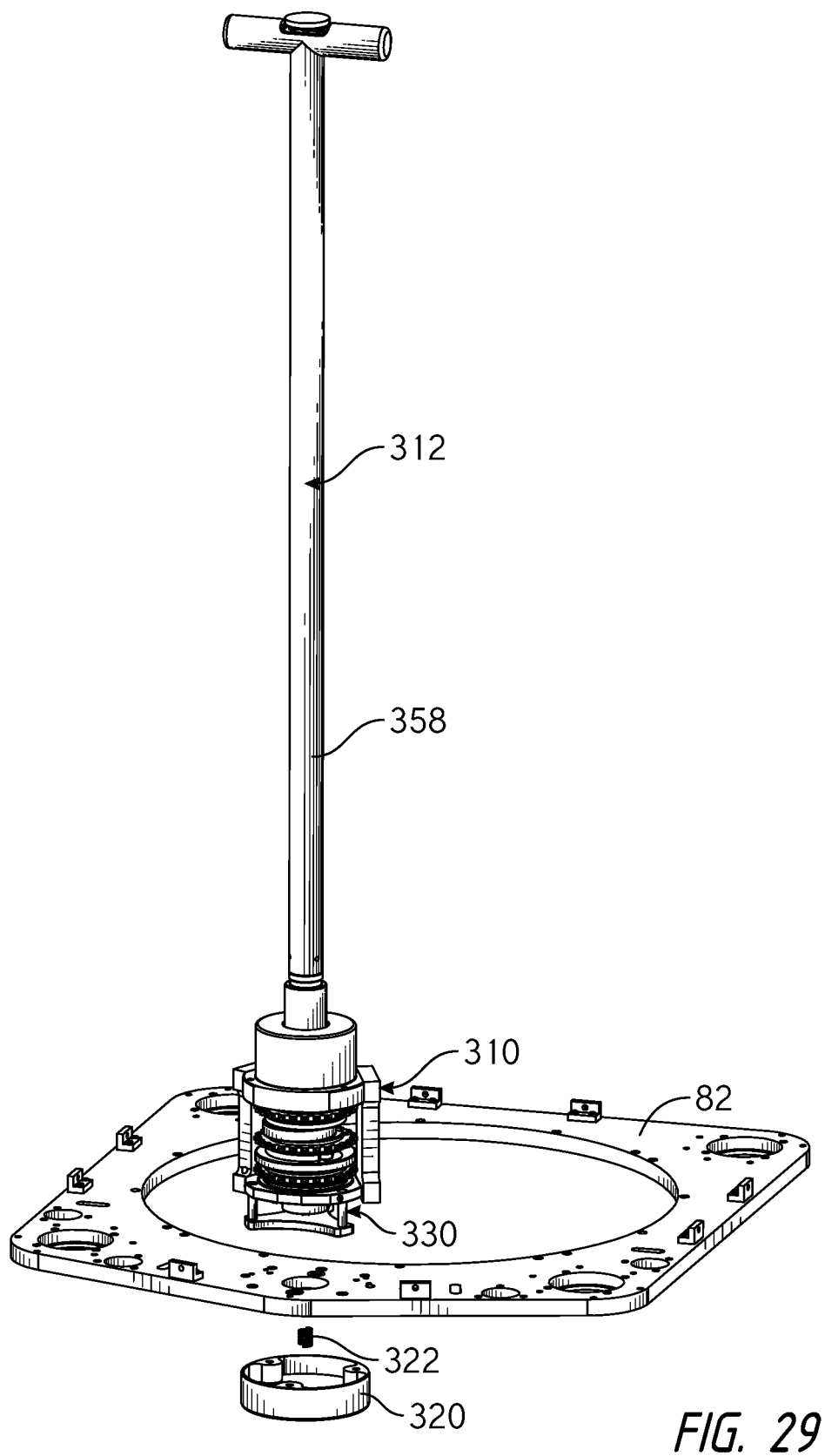

FIGS. 27-31 show another embodiment 300 having a steering transmission 310 shiftable between crab and corrective steering modes using an alternative handle 312. The caster wheel elements shown in FIGS. 5-9 may be omitted in the dolly 300 shown in FIGS. 27-32. They may also be omitted in the dolly 30 shown in FIGS. 1-2. Where either dolly 30 or 300 does not include the caster wheel elements, a straight kingpin 302 as shown in FIG. 27 may be used at each corner of the dolly 30 or 300. In this case, referring to FIG. 6, the arm 128 is permanently axially aligned with the riser 108, and the cup 110, disk 126 and thumbscrew may be omitted. Either dolly 30 and 300 may also be provided with a push bar 306, and with risers 108 or kingpins having a capped or closed off top 304, as shown in FIGS. 27-28.

Camera dollies are ordinary used primarily in crab steering mode, as this allows the camera to be moved and positioned as desired, without angulating the lens, i.e., crab movement does not change the azimuth angle of the lens. Generally, with camera dollies, corrective steering is used only as needed to turn a corner, or for dolly alignment. This occasional use tends to be brief, with dolly operator retuning to crab steering mode after brief and intermittent use of corrective steering mode. The dolly 300 allows for improved filming or video recording by simplifying shifting between steering modes. Via use of a spring, solenoid or other actuator, an axial force may be maintained on the steering transmission components that effect steering mode shifting, to hold the steering transmission into a first (typically crab mode) steering mode. The user may shift the steering transmission into a second steering mode (typically corrective mode) by pressing on a plunger on a steering handle on the dolly, or via an equivalent movement such as turning, twisting or pulling on a component linked to the steering transmission.

Figure 30:
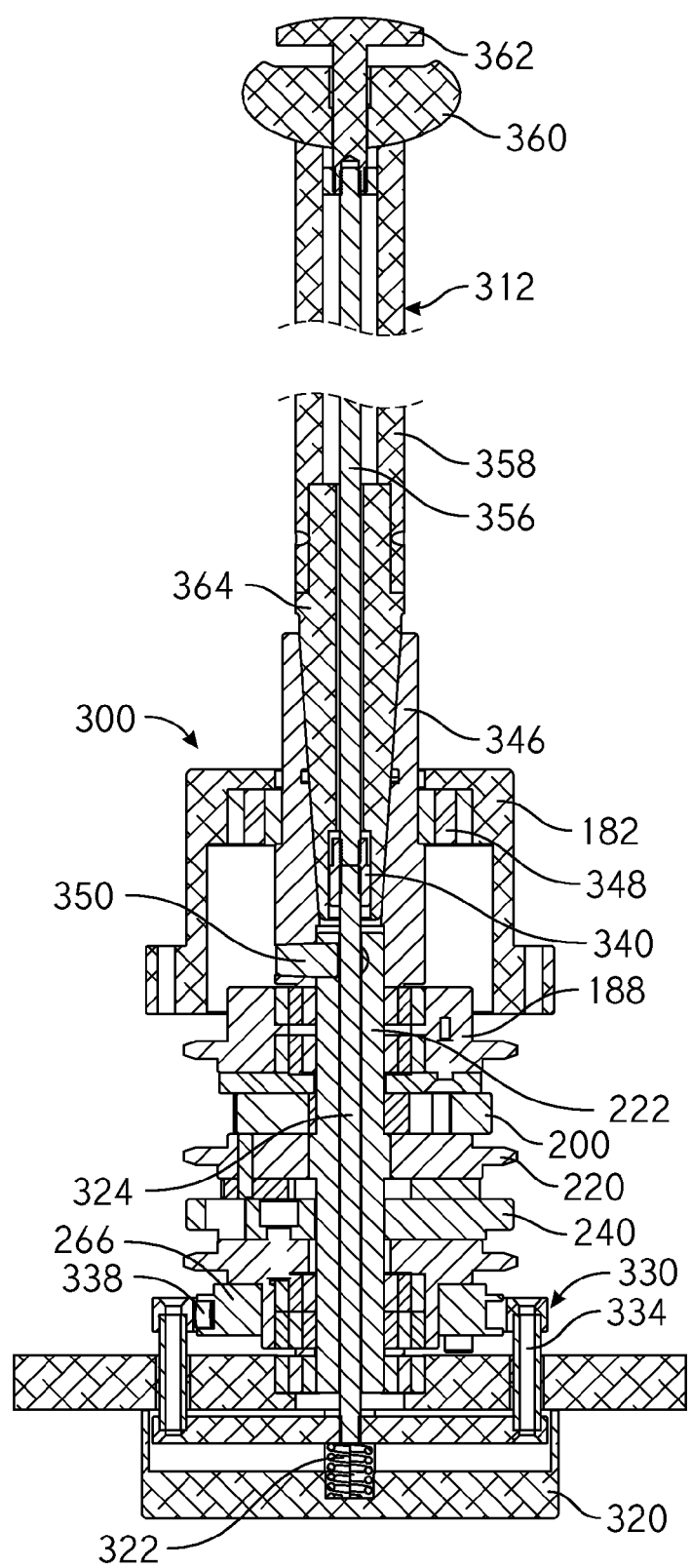
Figure 31:
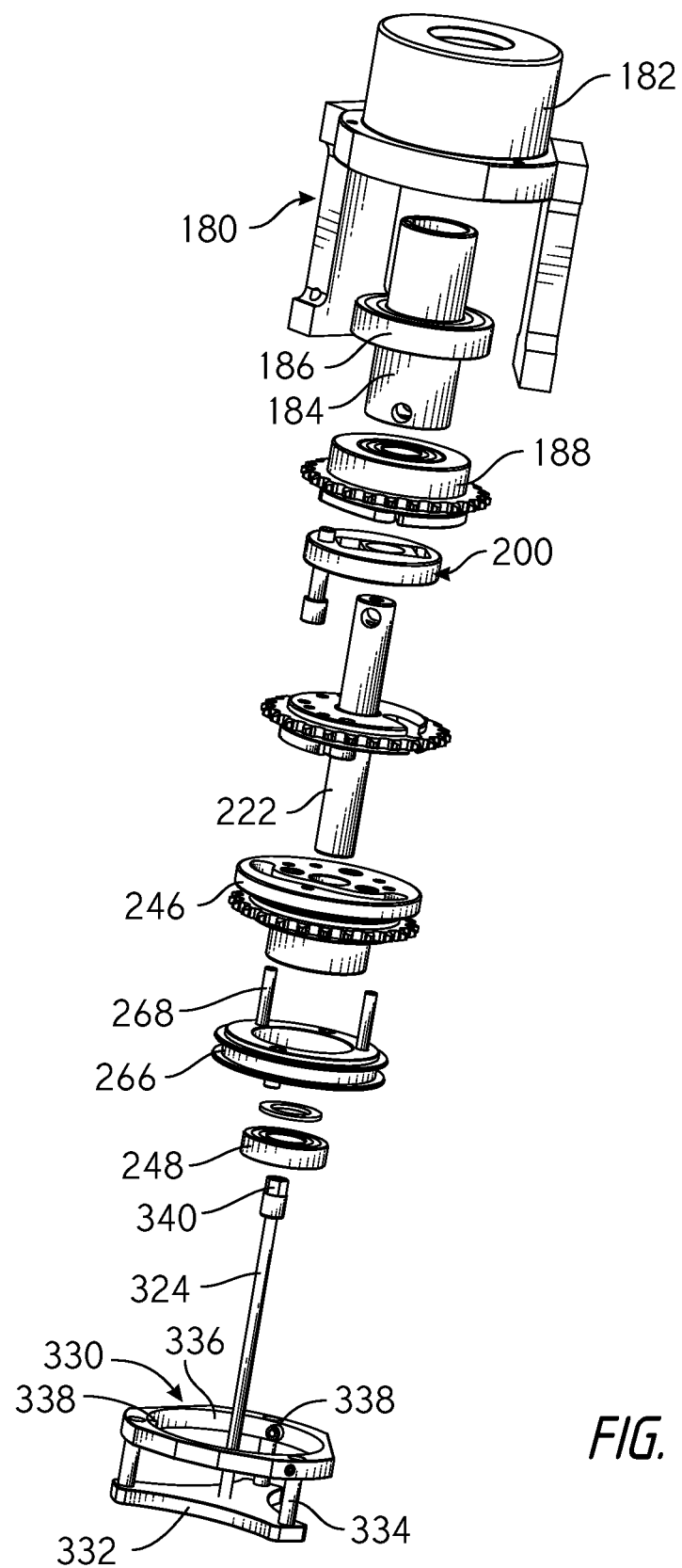

In the example of this concept shown in FIGS. 28-31, the dolly 300 has a spring 322 which may be supported on a cover 320 attached to a bottom surface of the bottom plate 82. Specifically, as shown in FIG. 31, a shift frame 330 has a spring plate 332 connected to a roller ring 336 by posts 334. The spring 322 pushes up on a spring plate 332. Comparing FIG. 31 with FIG. 14, in the dolly 300 the shift frame 330 may be used in place of the shift fork 250 and shift lever 258. As shown in FIG. 31, rollers 338 on the roller ring 336 may be positioned to roll within the channel or slot of the fork ring 266.

A spring rod 324 may extend up through the sprocket assemblies 240, 220 and 188 of the steering transmission 310, with the lower end of the spring rod 324 attached to the spring plate 332 of the shift frame 330. The spring 322 constantly exerts an upward force on the shift frame 330 and on the shift rod 324.

Referring to FIGS. 28 and 30, the handle 312 has a handle bar 360 attached onto the top end of a hollow handle tube 358. The lower end of a shift rod 356 within the handle tube is attachable to the spring rod 324 optionally via a threaded coupler 340. The upper end of the shift rod 356 is attached to a plunger 362 extending through the handle bar 360. In the example shown the plunger 362 is permanently attached to the upper end of the shift rod via screw threads. However, the plunger 362 may alternatively rest on top of the shift rod, with the plunger 362 optionally separable from the shift rod. A cone 364 on the lower end of the handle tube 358 may be configured to engage into a complimentary receiver 346 rotatably supported on a bearing 348 within the transmission housing 182. The receiver 346 may be attached to the axle 222 via a pin 350.

In use, during steering the dolly 300 operates in the same way as the dolly 30. The handle 312 is inserted into the steering transmission 310 with the cone 364 engaging into the receiver 346, and with a key 72 on the cone engaging a keyway 122 in the receiver, or vice versa. The lower end of the shift rod 356 may then be threaded into the coupler 340 by turning the plunger 362. In some designs, the coupler 340 and this step may be omitted, so that the lower end of the shift rod 356 simply rests on top of the spring rod 324. Turning the handle bar 360 turns the handle tube 358 and the cone 364. With the handle 312 installed, turning the handle bar 360 turns the axle 222, with the steering transmission 310 providing the same steering functions as the steering transmission 100.

Since the spring 322 constantly exerts an upward force on the shift frame 330, the steering transmission 310 is automatically constantly maintained in the crab steering mode. The dolly 300 is shifted into corrective steering mode via the operator pressing down on the plunger 362, when the steering system is at the zero or 180 degree position. The downward movement of the plunger 362 moves the shift rod 356, the spring rod 324 and the shift frame 330 down, against the upward force of the spring 322. These elements shift vertically but do not rotate. The rollers 338 on the shift frame 330 pull the fork ring 266 down, shifting the transmission into corrective steering mode. As described above relative to the dolly 30, the fork ring 266 moves up or down during shifting and rotates with the bottom sprocket assembly.

The dolly 300 will remain in the corrective steering mode while the dolly operator holds the plunger 362 down. When the dolly operator releases the plunger 362, the dolly 300 automatically shifts back to the crab steering mode when the steering system is turned to the zero or 180 degree positions, i.e., when the wheels are straight and the angular orientations of the shift pins 268 align with shift pin holes in the sprocket assemblies.

The spring 322 may be selected to exert an upward force on the spring rod 324 that is only nominally higher than the combined weight (about 1 kg or 2 lbs.) of the vertically moving components of the steering transmission 310. This allows the plunger to be pressed down using a very light touch. The dolly operator can then hold the steering system in the corrective mode with minimal hand effort. In some designs the receiver 346 may be provided with a split collar and a locking bolt, or similar clamping mechanism, to positively clamp or lock the handle 312 onto the dolly 300, if desired. The geometric steering angle correction provided by the differential may optionally be provided by a cam and/or lever design, without using the differential shown in the drawing.

As shown in FIG. 28, the spring 322 may be replaced with, or supplemented by, a solenoid 370 positioned to drive the spring rod up or down. This allows the dolly to be shifted between steering modes via a switch instead of via the plunger. The switch, which may be located on the handle bar 360, may be electrically or wirelessly linked to the solenoid 370. As the solenoid 370 is ordinarily used only intermittently, it may be powered by a relatively compact battery. Use of the solenoid also allows the dolly to remain in either steering mode without the operator holding the plunger down, or taking any other action. Except as described above, the dolly 300 may have the same design and operation as the dolly 30.

Turning to FIGS. 32-35, the dolly may be provided with an adjustable height handle 374. The handle 374 may include a handle block 384 attached to the top end of an outer tube 376, with a handle bar 386 on the handle block 384. The bottom end of the outer tube 376 may be provided with longitudinal slots 380 forming tabs 408, with external threads provided above the slots 380. A lower tube 404 can telescopically slide within the outer tube 376. A key 382 on the outer tube may extend into a key slot 406 in the lower tube 404, so that tubes 376 and 406 necessarily rotate together. A hand nut 400 may be captive on the lower tube 404 and positioned to screw onto the threads 378 on the outer tube 376.

Figure 32:
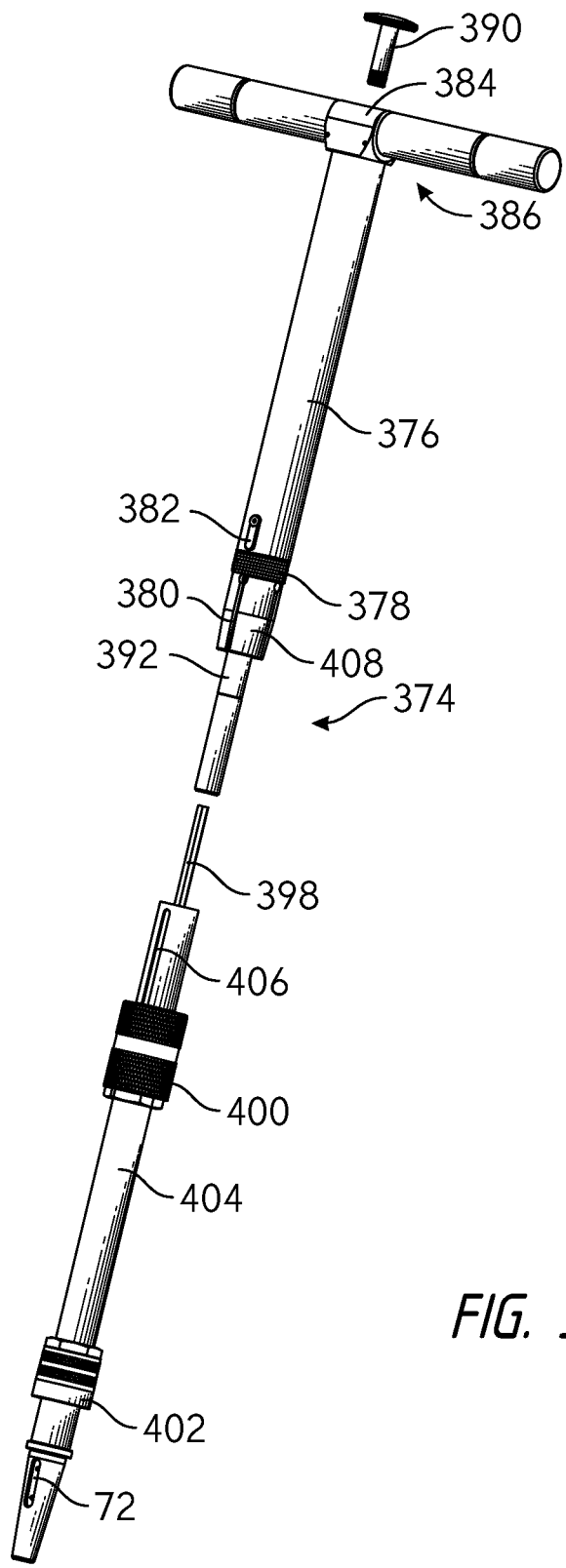
Figure 33:
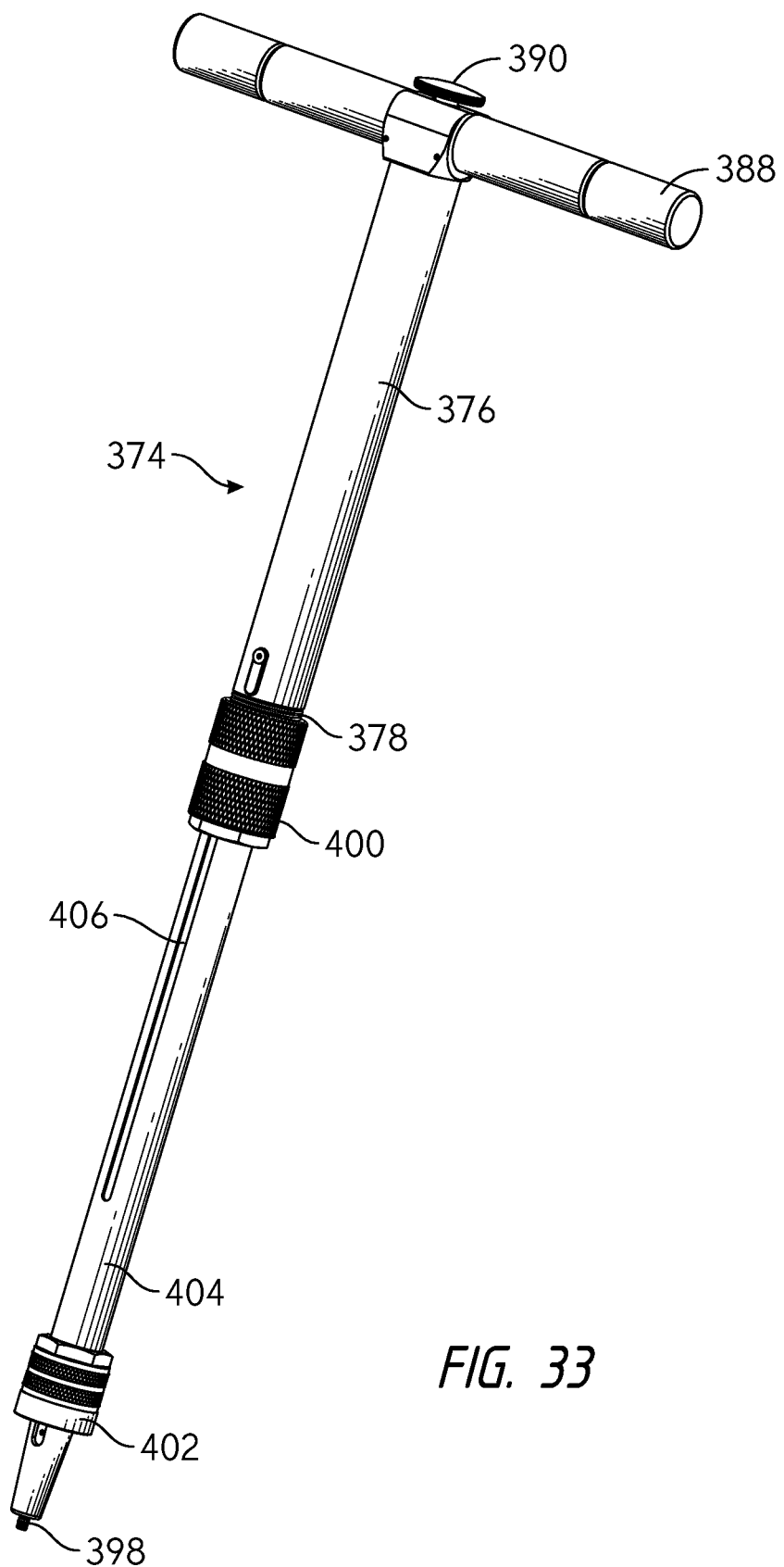
Figure 35:
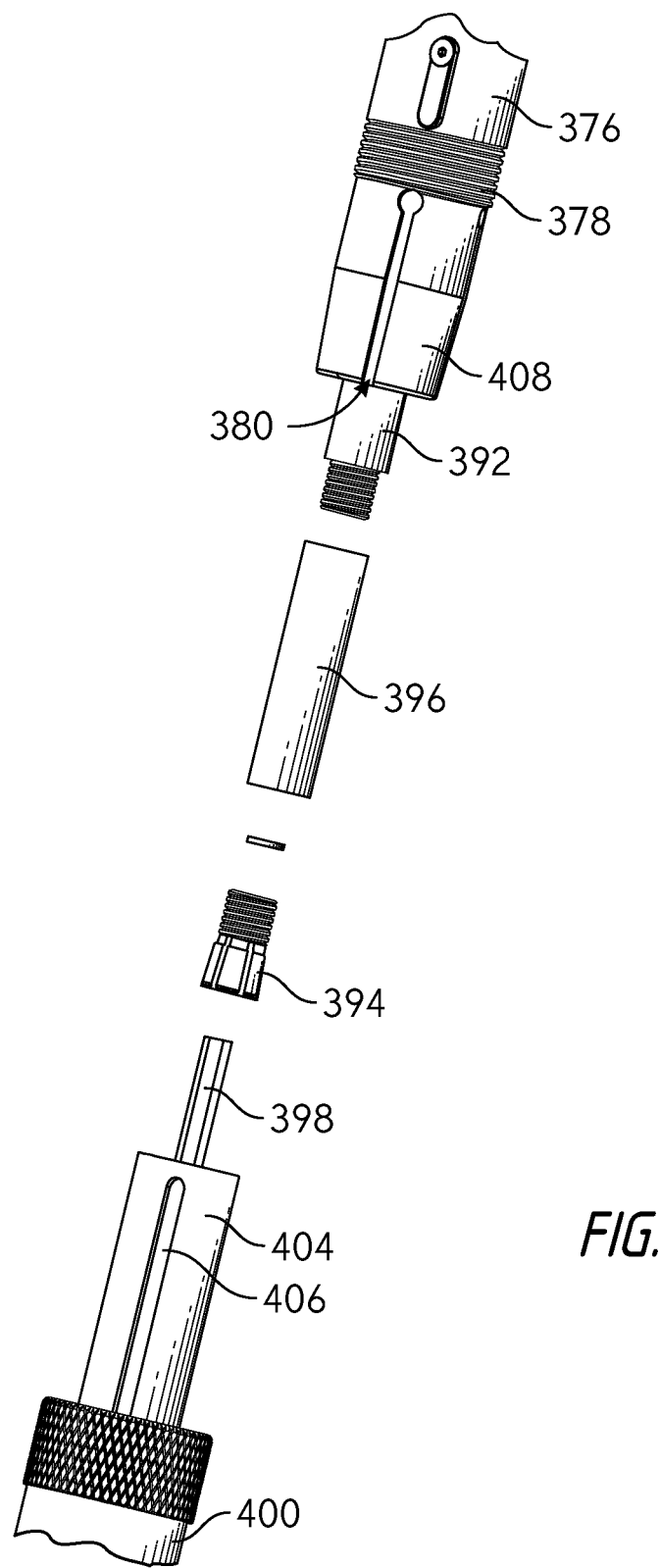

As shown in FIGS. 32 and 35, a plunger 390 is rigidly attached onto the upper end of an inner tube 392, and a split collet 394 is attached to a lower end of the inner tube 392. The inner tube 392 extends through a turnbuckle sleeve 396 positioned above the split collet 394. The sleeve 396 has a left hand thread at one end and a right hand thread at the other end, so that turning the inner tube 392 causes the collet 394 to move into or out of the sleeve 396. The spring rod 324 and the shift rod 356 shown in FIG. 28 are replaced with a hexagonal (or other geometric shape) shift rod 398 that cannot rotate within the collet 394. The cap 182 of the transmission housing shown in FIG. 31 may be threaded, with the handle 374 then attached via a threaded collar 402 captive on the lower tube 404.

In use, the height of the handle 374 may be adjusted by loosening the hand nut 400 to allow the outer tube 376 to slide up or down over the lower tube. The shift rod 398 must stay connected to the plunger 390 to allow for shifting of the steering transmission, regardless of the handle height adjustment. This is achieved via operation of the collet 394. As shown in FIGS. 32 and 35, turning the plunger counter clockwise pushes the collet 394 out of the sleeve 394, allowing the fingers of the collet to flare outwardly sufficiently to allow the collet 394 to slide over the shift rod 398. With the hand nut 400 loosened, the outer tube 376 may be telescopically pulled up or pushed down to position the handle 386 at a desired height. The loosened collet 394 correspondingly slides up or down on the shift rod 398.

With the handle 386 at the desired height, the hand nut 400 is tightened causing the tabs 408 to clamp inwardly onto the lower tube 404, locking the handle 386 in a fixed vertical position. The plunger 390 is rotated clockwise drawing the collet 394 into the sleeve 396 causing the collet fingers to clamp inwardly onto the shift rod 398. The shift rod is then rigidly reconnected to the plunger, allowing the plunger to operate as described above, regardless of the adjusted height of the handle bar. Although the collet and shift rod may have a round cross section, a hexagonal or other polygon shape may provide a more secure attachment between them.

Figure 34:
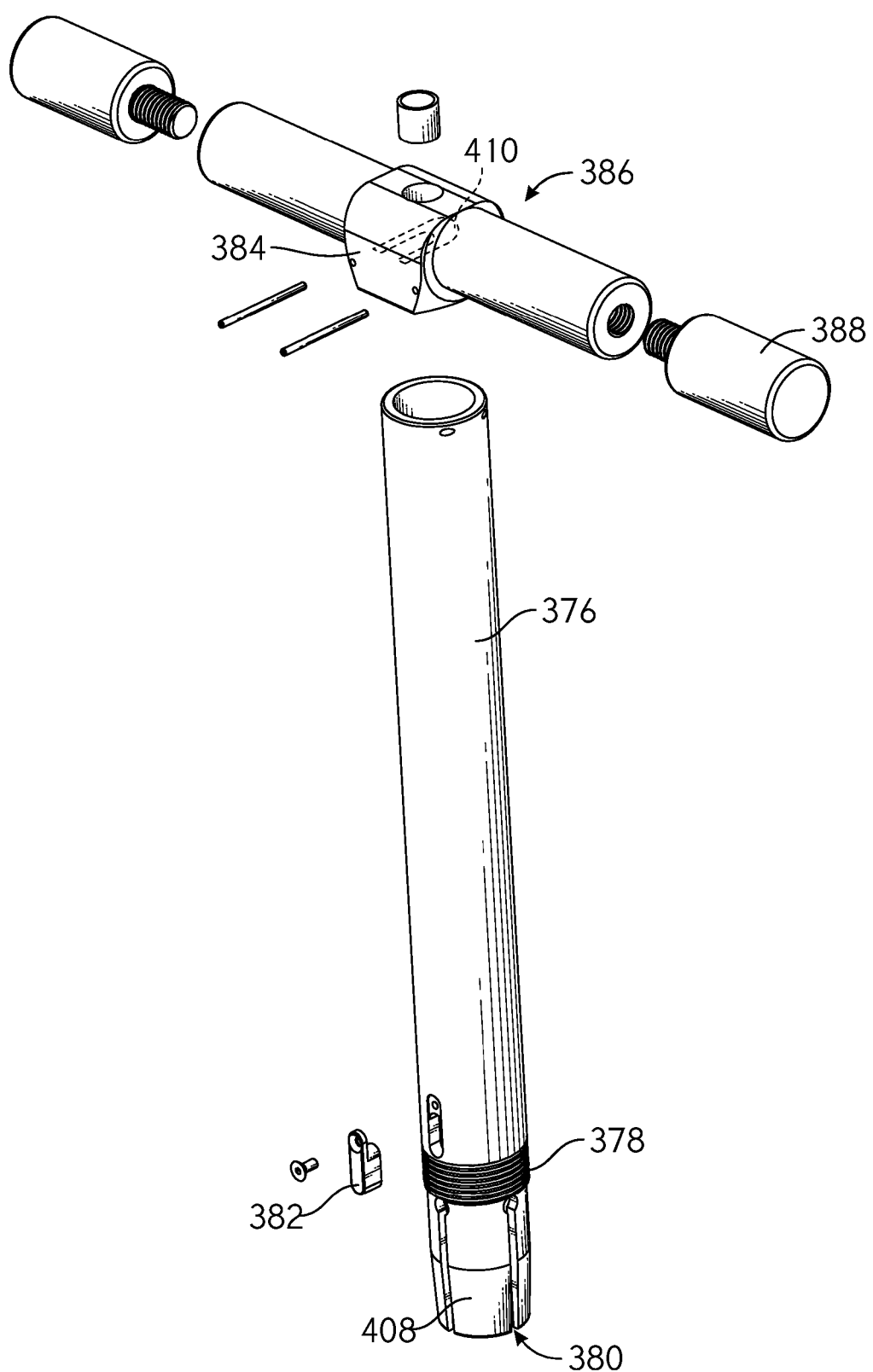

As shown in FIG. 34, in an alternative design, the plunger 390 may be replaced with a handle as shown for example in U.S. Pat. No. 6,520,642, where twisting the handle bar positively drives the inner tube 392 up or down to effect shifting. In this design, a rack and pinion mechanism may be used to convert the rotary movement of the handle bar into linear movement of the inner tube. Since the shift rod need only move about 10 mm to effect shifting, a shift fork 410 in the handle block 384 may be pivotally attached to the top end of the inner tube 392 to similarly allow rotary movement of the handle bar to shift the steering transmission.

Thus, a novel camera dolly has been shown and described. Various changes and modifications may of course be made without departing from the spirit and scope of the invention. The invention, therefore, should not be limited, except by the following claims and their equivalents.

The invention claimed is:

1. A camera dolly comprising:
a chassis;
first, second, third and fourth kingpins rotatably supported on the chassis;
a steering mode transmission on the chassis having a plurality of vertically stacked sprockets and providing first and second steering modes;
a chain extending around each of the stacked sprockets and around at least one of the kingpins;
at least one shift pin movable into an opening in at least one of the sprockets; and
at least one spring exerting spring force on the shift pin in a first vertical direction and holding the steering mode transmission into the first steering mode, with the steering mode transmission shiftable into the second steering mode by moving the shift pin in a second vertical direction, opposite from the first vertical direction, and against the spring force.

2. The camera dolly of claim 1 with the chassis having a lower plate, a housing on a bottom surface of the lower plate, and with the spring in the housing.

3. The camera dolly of claim 1 having a plurality of shift pins on a shift frame and with the spring urging the shift frame in an upward direction, and wherein the first steering mode is a crab steering mode.

4. The camera dolly of claim 3 further including a spring rod on the shift frame, with the spring rod extending centrally through each of the sprockets.

5. The camera dolly of claim 4 further including a steering handle engageable onto the steering transmission, with the steering handle including a shift rod axially movable within a handle tube, and with the shift rod engageable with the spring rod.

6. The camera dolly of claim 5 further including handle bar on the steering handle, and a plunger on the handle bar attached to the shift rod.

7. The camera dolly of claim 5 further including a threaded coupler attaching a lower end of the shift rod to an upper end of the spring rod.

8. The camera dolly of claim 5 with the spring urging the shift pins in a direction towards the handle bar.

9. The camera dolly of claim 1 wherein the first steering mode is a crab steering mode and the second steering mode is a corrective steering mode.

10. A camera dolly comprising:
a chassis;
first, second, third and fourth kingpin sprockets attached to first, second, third and fourth kingpins rotatably supported on the chassis, respectively;
at least one wheel rotatably attached to each kingpin;
a steering mode transmission on the chassis having a crab sprocket, a left sprocket and a right sprocket, with each of the sprockets having a common central axis of rotation;
a crab chain extending around the crab sprocket and around the first and second kingpin sprockets;
a left chain extending around the left sprocket and the third kingpin sprocket;
a right chain extending around the right sprocket and the fourth kingpin sprocket;

a shift frame movable from a first position wherein the steering mode transmission is in a crab steering mode, to a second position wherein the steering mode transmission is in a corrective steering mode;

a spring urging the shift frame into the first position, to hold the steering mode transmission into the crab steering mode; and a steering handle having a plunger linked to the shift frame, with movement of the plunger in a second direction against the spring shifting the steering mode transmission into the corrective steering mode.

11. The camera dolly of claim 10 with the spring urging the shift frame in a first direction opposite to the second direction.

12. The camera dolly of claim 10 with the shift frame including two or more shift pins moveable into and out of openings in one or more of the sprockets.

13. The camera dolly of claim 10 with the plunger linked to the shift frame via shift rod in the steering handle moving a spring rod attached to the shift frame and extending centrally through the sprockets.

14. The camera dolly of claim 10 with the chassis having four corners and with one of the kingpins at each of the corners.

15. The camera dolly of claim 10 with the steering handle having a key configured to engage with a keyway in the steering transmission.

16. The camera dolly of claim 10 further comprising a column or riser on the chassis.

17. A method for operating a camera dolly having a steering system including a steering mode transmission, comprising:

holding the steering mode transmission on the camera dolly into a crab steering mode via a spring force acting on one or more shift pins in the steering mode transmission;

shifting the steering mode transmission into a corrective steering mode by pressing on a plunger on a steering handle;

allowing the steering mode transmission to return to the crab steering mode via action of the spring by releasing the plunger and turning the steering handle to move the steering system into a zero or 180 degree position.

18. A camera dolly comprising:

a chassis;

first, second, third and fourth kingpins rotatably supported on the chassis;

a steering mode transmission on the chassis having a plurality of vertically stacked sprockets;

a chain extending around each of the stacked sprockets and around at least one of the kingpins;

one or more shift pins movable into openings in at least one of the sprockets;

at least one spring urging the shift pins in a first vertical direction;

with the shift pins on a shift frame and with the spring urging the shift frame in an upward direction; and a spring rod on the shift frame, with the spring rod extending centrally through each of the sprockets.

* * * * *